(12) United States Patent
Sundermann

(10) Patent No.: US 9,586,354 B2
(45) Date of Patent: Mar. 7, 2017

(54) INJECTION-MOLDING TOOL AND METHOD FOR MODIFYING SUCH AN INJECTION-MOLDING TOOL IN AN INJECTION-MOLDING MACHINE

(71) Applicant: Alexander Sundermann, Hille (DE)

(72) Inventor: Alexander Sundermann, Hille (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 983 days.

(21) Appl. No.: 13/721,574

(22) Filed: Dec. 20, 2012

(65) Prior Publication Data

US 2014/0175690 A1 Jun. 26, 2014
US 2016/0176090 A9 Jun. 23, 2016

(30) Foreign Application Priority Data

Dec. 20, 2011 (DE) .......................... 10 2011 056 694

(51) Int. Cl.
*B29C 45/66* (2006.01)
*B29C 45/17* (2006.01)
*B29C 45/26* (2006.01)

(52) U.S. Cl.
CPC ...... *B29C 45/1756* (2013.01); *B29C 45/2673* (2013.01); *B29C 45/2675* (2013.01)

(58) Field of Classification Search
CPC .................. B29C 45/2673; B29C 45/1756
See application file for complete search history.

(56) References Cited

U.S. PATENT DOCUMENTS

| | | | |
|---|---|---|---|
| 3,871,611 A | 3/1975 | Taketa | |
| 4,202,522 A | 5/1980 | Hanas et al. | |
| 5,350,289 A * | 9/1994 | Martin | B29C 31/006 264/328.1 |
| 7,204,685 B1 * | 4/2007 | Crain | B29C 45/2673 425/185 |
| 2004/0076703 A1 * | 4/2004 | Saulle | B29C 45/2673 425/190 |
| 2012/0231103 A1 * | 9/2012 | Catoen | B29C 45/17 425/150 |

FOREIGN PATENT DOCUMENTS

| | | |
|---|---|---|
| DE | 37 16796 A1 | 11/1987 |
| DE | 10 2005 023 147 A1 | 11/2006 |
| WO | 00/38899 | 7/2000 |

* cited by examiner

*Primary Examiner* — Galen Hauth
(74) *Attorney, Agent, or Firm* — Renner, Otto, Boisselle & Sklar, LLP

(57) ABSTRACT

An injection-molding tool (1) for a clamping unit of an injection-molding machine for producing injection-molded parts, comprising a frame tool, consisting of a first, nozzle-side tool half (2) and a second, ejector-side tool half (3), is described. Mold insert halves (50, 51) of at least one mold insert (11) are fitted in slide-in frames (9, 10). The slide-in frames (9, 10) with the at least one mold insert (11) fitted in them can be connected to one another to form a slide-in module (8) which in the modifying process can be removed as a whole from the frame tool, which in the modifying process remains connected to the injection-molding machine.

15 Claims, 21 Drawing Sheets a)

b)

INJECTION-MOLDING TOOL AND METHOD FOR MODIFYING SUCH AN INJECTION-MOLDING TOOL IN AN INJECTION-MOLDING MACHINE

RELATED APPLICATION DATA

This application claims priority to German Patent Application No. 10 2011 056 694.5 filed on Dec. 20, 2011, the contents of which is hereby incorporated by reference in its entirety.

FIELD OF THE INVENTION

The invention relates to an injection-molding tool for a clamping unit of an injection-molding machine for producing injection-molded parts, comprising a frame tool, consisting of a first, nozzle-side tool half, for attachment to a nozzle-side, fixed platen of the clamping unit of an injection-molding machine, and a second, ejector-side tool half, for attachment to an ejector-side movable platen of the clamping unit of the injection-molding machine, wherein the first, nozzle-side tool half has at least one injection-molding material distributing unit, which interacts with a machine nozzle of the injection-molding machine that can be attached to the nozzle-side platen and which has a runner and at least one injection-molding nozzle, protruding from the first, nozzle-side tool half in the direction of the second, ejector-side tool half, wherein the runner leads from an inlet opening for the attachment of the machine nozzle of the injection-molding machine to the at least one injection-molding nozzle, and the second, ejector-side tool half has at least one ejector so unit, and wherein at least one mold insert respectively formed by two mold insert halves and having at least one cavity adapted to a molded part is provided, wherein the first, nozzle-side mold insert half of a mold insert is adapted for connection to the first, nozzle-side tool half and the second, ejector-side mold insert half of the same mold insert is adapted for connection to the second, ejector-side tool half.

The invention also relates to a method for modifying such an injection-molding tool on an injection-molding machine.

BACKGROUND

For the inexpensive mass production of molded parts by injection molding, in particular of plastics molded parts, injection-molding machines are used, having an injection unit, designed for compounding the raw material and injecting the injection-molding material under pressure into an injection-molding tool, and a clamping unit, receiving the injection-molding tool and intended for opening and closing. The injection unit generally has a screw, which is rotatably guided in a cylinder and has a pellets inlet in the rear region and a machine nozzle at the front, free end. The injection-molding material melted in the screw is injected into the injection-molding tool through the machine nozzle. The clamping unit has a nozzle-side platen, which is arranged perpendicularly on a machine frame and carries a nozzle-side tool half. The clamping unit also has an opposite movable platen, which is generally hydraulically movable in the direction of the fixed platen and carries an ejector-side tool half of the injection-molding tool. The machine space may also have a further fixed end plate, wherein a closing actuator, such as for example at least one hydraulic cylinder, is present between the end plate and the movable platen for opening and closing the movable platen.

Thus, an individualized injection-molding tool with individualized cavities and an individualized ejector mechanism is required for each molded part.

U.S. Pat. No. 7,204,685 B1 proposes for the high-speed and cost-effective production of individualized injection-molding tools a modular injection-molding tool in which, instead of monolithic tool plates, frame plates for receiving various mold inserts are provided. The mold inserts have individualized cavities and individualized ejector elements adapted thereto. The two halves of a mold insert are handled separately from one another and, during modification, are connected to the respective nozzle-side or ejector-side tool half.

In a corresponding way, such modular mold inserts are also described in U.S. Pat. No. 4,202,522 A and U.S. Pat. No. 3,871,611 A as well as in WO 00/38899 A1.

DE 10 2005 023 147 A1 describes a mold tool for producing injection-molded plastics parts, comprising a cavity, which can be connected to a plastics injection nozzle, and comprising coolant guides and tool parts comprising an ejector unit, individual parts of which can be fixed such that they can be detached from one another. The mold tool is designed as a modular tool for a master tool standardized on the basis of predeterminable parameters. The master tool has standardized attaching and connecting elements. The mold tool has at least one mold insert, which is adapted to the standardized attaching and connecting elements, can be detachably connected to the master mold and has an individualized cavity.

SUMMARY

The present invention provides an improved injection-molding tool with which the modifying process is speeded up and the production of injection-molding tools adapted to individual molded parts is simplified.

More particularly, the invention provides an injection-molding tool with the features of claim 1 and a method with the features of claim 16.

Advantageous embodiments are described in the dependent claims.

Proposed is an injection-molding tool in which mold insert halves of the at least one mold insert are fitted in slide-in frames and the slide-in frames can be connected to one another to form a slide-in module that can be removed from the frame tool. The nozzle-side slide-in frame has at least one nozzle opening for respectively receiving an assigned injection-molding nozzle of the injection-molding material distributing unit, which is arranged on the first, nozzle-side tool half.

As a difference from conventional injection-molding tools, in which the nozzle-side and ejector-side tool halves are unscrewed and handled separately after opening the clamping unit of an injection-molding machine or the nozzle-side and ejector-side tool halves together with the mold inserts fitted in them are removed from the platens of the injection-molding machine altogether as an individualized tool block during modification, in the present case there is provided a slide-in module, which is inserted into the nozzle-side and ejector-side mold halves and carries the individualized mold inserts. This slide-in module consequently forms a tool assembly individualized for the production of specific molded parts, while the nozzle-side and ejector-side tool halves are standardized and remain connected to the platens of the injection-molding machine during the modifying process. The nozzle-side and ejector-side tool halves can consequently also be used for other slide-in modules, which on the one hand simplifies and speeds up the production of the individualized slide-in modules, since no adaptation of the tool halves is required, and on the other hand speeds up the modifying process. This is so because, during the modifying process, the tool halves can remain temperature-controlled and do not have to be disconnected from the supply lines.

In particular, a hot-runner manifold bar known per se with the associated hot-runner nozzles of the injection-molding tool remains in the frame tool and need not be disconnected from the supply lines, so that they can remain heated up. This reduces the restarting time.

On the other hand, the mold inserts having individualized cavities are also not handled separately on the nozzle side and the ejector side, but are combined by the slide-in frames to form a compact slide-in module, which is removed as a whole from the tool halves during modification.

The handling of the mold insert halves of the at least one mold insert as a compact slide-in module that can be easily removed from the tool halves is accomplished by the fitting of the mold insert halves into slide-in frames and by suitable connecting means, such as threaded bores. The slide-in frames can be connected with the aid of the threaded bores to a screw-on connector bridge plate for the modifying process to form a compact slide-in module. For example, an eyelet on the connector bridge plate then allows the slide-in module to be easily handled and lifted out from the clamping unit of the injection-molding machine. By contrast, during operation, the mold insert halves and slide-in frames must be separate from one another, in order to be able to detach the ejector-side and nozzle-side mold insert halves from one another, so that removal of the at least one molded part produced is possible.

It is particularly advantageous if the second, ejector-side mold insert half has a displaceably mounted ejector plate. The ejector-side slide-in frame of the slide-in module then has at least one opening for receiving the ejector plate of an assigned second, ejector-side mold insert half, the ejector plate of which consequently protrudes into the ejector-side slide-in frame. When the ejector-side slide-in frame is fitted onto the ejector-side tool half, the ejector plate can then interact with an ejector unit of the ejector-side tool half. The ejector unit of the ejector-side tool half is consequently provided as standard and the ejector plate forms an interface of individual ejector elements of the ejector-side mold insert half that are adapted to a molded part and are actuated by way of the ejector plate of the ejector unit of the ejector-side tool half.

The ejector-side mold insert half is also connected to the ejector-side slide-in frame and for this purpose is preferably detachably screwed to the ejector-side slide-in frame.

By contrast, the at least one first, nozzle-side mold insert half is advantageously connected to the nozzle-side slide-in frame. In this case, the nozzle-side mold insert half is preferably detachably screwed to the nozzle-side slide-in frame. The nozzle-side slide-in frame preferably has at least one nozzle opening for respectively receiving an assigned injection-molding nozzle of the nozzle-side tool half. The ejector-side slide-in frame preferably has at least one projecting injection-molding manifold head, which is aligned for arrangement opposite an assigned injection-molding nozzle and, at its free head end, has runners for conducting injection-molding material emerging from the assigned injection-molding nozzle into cavities of at least one mold insert.

The machine nozzle of the injection-molding machine is brought in front of the nozzle-side tool half and the injection-molding material extruded by the machine screw and emerging from the machine nozzle is conducted by a manifold bar in the hot-runner manifold block, i.e. by the injection-molding material distributing unit, into the at least one injection-molding nozzle projecting from the nozzle-side tool half. When the clamping unit is closed during operation, the free end of the at least one injection-molding nozzle is then taken up to the free end of an injection-molding manifold head projecting from the ejector-side slide-in frame, so that the injection-molding material emerging from the at least one injection-molding nozzle is conducted via runners at the free head end of the projecting injection-molding manifold head into assigned cavities. With the aid of such an injection-molding manifold head, an adaptation of the guidance of the injection-molding material into individualized cavities is possible by adaptation of the injection-molding manifold head. The at least one injection-molding nozzle of the standardized nozzle-side tool half is in this case received by a nozzle opening of the nozzle-side slide-in frame. In the event that the slide-in frame has a number of compartments for receiving a number of mold inserts, with the aid of the injection-molding manifold head it is possible if appropriate to leave some compartments of the slide-in frame unoccupied, or to shut them off, and to carry out the injection-molding process only with a reduced number of the possible number of mold inserts or cavities.

Consequently, various conventional injection-molding techniques can also be advantageously used. For instance, apart from direct injection, it is also possible to use a needle driving technique, in which the nozzle is shut off by a driven needle, with the associated control units.

It is particularly advantageous if the injection-molding manifold head has a sprue ejector arranged in a linearly movable manner in or on the injection-molding manifold head. The sprue of injection-molding material occurring in the production of injection-molded parts can consequently be easily ejected by means of a sprue ejector guided in or on the injection-molding manifold head. This sprue ejector is in this case preferably able to be activated with a delay, once the ejector elements of the mold inserts have ejected the molded parts themselves.

It is particularly advantageous if the injection-molding manifold head is rotatable for adaptation of the alignment of the runners arranged at the free head end. In this way, the alignment of the runners with the arrangement of the cavities in the mold inserts and with the respective loading of the compartments of the slide-in frames with mold inserts can be set. A shutting off of individual cavities is possible.

It is particularly advantageous if, on both sides of the first or second tool half, guiding profiles extend in the direction of the other tool half and the other tool half is guided in a linearly displaceable manner on the guiding profiles. The slide-in module can then be inserted into the intermediate space between the first and second tool halves and the guiding profiles extending on both sides between the first and second tool halves. With the aid of these lateral guiding profiles, which are preferably right-angled in cross section, a reliable linear guidance of the first, nozzle-side tool half and the second, ejector-side tool half during the opening and closing of the clamping unit is achieved, while saving installation space, and the greatest possible space is provided for the insertion of the slide-in module into the intermediate space between the guiding profiles.

In the case of this embodiment with guiding profiles on both sides, a verification as to whether the clamping force is sufficient is accomplished in a particularly reliable and easy way by at least one measuring unit, which is arranged on a side wall of a tool half and is aligned with the free end of an assigned guiding profile, which is fixedly connected to another tool half and extends in the direction of the measuring unit. The distance between the movable part and the fixed part of the injection-molding tool can be optimally determined by the measuring unit with the aid of the distance between the free end of the assigned guiding profile and the measuring unit. During operation, a change in the distance indicates that the set clamping pressure is not sufficient.

It is also advantageous if guiding profiles extend from the lower region of one tool half in the direction of the other tool half and the other tool half is mounted in a slidingly displaceable manner on the guiding profiles and is at least partially carried by the guiding profiles in the modifying process. Consequently, the first and second tool halves remain supported on one another in a block-like manner in the modifying process, so that the slide-in module that is arranged between the first, nozzle-side tool half and the second, ejector-side tool half can be pulled out upwardly from the two tool halves without impairing the secure mounting of the tool halves.

In a further preferred embodiment, the second, ejector-side tool half has a standard ejector unit with standardized movable ejector elements, which extend movably in the direction of the first, nozzle-side tool half for the actuation of at least one individualized ejector unit of the at least one assigned mold insert. This standard ejector unit may be, for example, ejector rods which are mounted in an electromechanically or hydraulically linearly movable manner in an ejector plate of the ejector-side tool half and the free head ends of which butt against ejector plates of an assigned ejector-side mold insert half and linearly displace them.

It is also advantageous if the first, nozzle-side tool half has a standardized hot-runner manifold bar for compounding the injection-molding material, comprising at least one injection-molding nozzle, protruding in the direction of the second, ejector-side tool half, and comprising a runner, leading from an inlet opening for the attachment of the machine nozzle to the injection-molding machine to the at least one injection-molding nozzle. Consequently, the machine nozzle is not used directly for introducing extruded injection-molding material into the at least one cavity, but instead a standardized injection-molding material distributing unit (hot-runner manifold bar) with at least one projecting injection-molding nozzle is provided on the nozzle-side tool half and interacts with the individualized slide-in module. In this way it is possible to create a modular system in which, for example, a standardized first, nozzle-side tool half is provided with a single injection-molding nozzle, which interacts with a slide-in frame for one to four mold inserts.

However, there may also be provided a first, nozzle-side tool half with two injection-molding nozzles arranged one above the other or one next to the other, which interacts with one to eight mold inserts.

It is also conceivable for a nozzle-side tool half to have four, six or more symmetrically arranged injection-molding nozzles and for an individualized slide-in module to be adapted to one of these variants of the standardized nozzle-side tool halves according to requirements and the size of the molded parts and mold inserts assigned thereto.

To simplify the modifying process, the first, nozzle-side tool half preferably has adjacent to the slide-in module a nozzle-side mold plate, which can be connected to at least one further plate of the first, nozzle-side tool half and, for the modifying process, can optionally be detached from the at least one further plate of the first, nozzle-side tool half and can be connected to the second, ejector-side tool half, while leaving an intermediate space for the slide-in module. By connecting the nozzle-side mold plate to the ejector-side tool half in the modifying process, a defined delimited intermediate space is provided for the insertion of the slide-in module, which is slid in between the nozzle-side mold plate and the free surface of the ejector-side tool half. With the aid of this nozzle-side mold plate that can be optionally connected to the ejector-side tool half in the modifying process and can be connected to the further plates of the nozzle-side tool half for the injection-molding process, a simple and quick modification of the slide-in module is accomplished.

In this case, a pivotable locking lever is preferably arranged respectively on both sides of the nozzle-side mold plate for locking the nozzle-side mold plate optionally to a further plate of the first, nozzle-side tool half or to a second, ejector-side tool half.

The mold insert halves preferably have temperature-control channels with inlets and outlets communicating therewith for fluid for cooling or heating the mold insert. During the modification of the slide-in module, the supply lines should be disconnected from the mold insert halves.

A standardized number of inlet/outlet openings are advantageously provided at various positions of the temperature-control channels. Such a standardized mold insert can then be adapted individually to a cavity, in that standardized inlet/outlet openings with pipe attachment connectors can be used as inlets and outlets and the further inlet/outlet openings can be shut off for the individual adaptation of the fluid guidance in a mold insert to an individual cavity. With the aid of such mold inserts, initially produced in a standardized form, individual mold inserts can be created in a quick and easy way, in that cavities are introduced into the mold insert halves and the standardized temperature-control channels are made to match this cavity. In this case it is not absolutely necessary to introduce further temperature-control channels. It is often sufficient to adapt the flow and the direction of flow of the fluid to the requirements by suitable selection of the standardized inlet/outlet openings already provided.

It is particularly advantageous if the mold inserts have movably mounted slide elements for demolding molded parts that have undercuts. These slide elements may also be present as standard in a standardized mold insert and only adapted later to the desired contour for individualization. This is often accomplished while retaining the movably mounted slide elements and standardized kinematics by attaching individualized slide inserts to standardized slide elements.

To reduce the heat transfer, it is advantageous if heat-insulating panels, heat-insulating intermediate layers and/or spacing panels are arranged between the slide-in frames and the neighboring mold inserts.

Easy and quick modification of an injection-molding tool described above on an injection-molding machine is accomplished by the steps of:
opening the clamping unit by moving the second, ejector-side tool half in a direction away from the first, nozzle-side tool half;
detaching the nozzle-side slide-in frame from the first, nozzle-side tool half and the ejector-side slide-in frame from the second, ejector-side tool half;
closing the clamping unit of the injection-molding machine by moving the second, ejector-side tool half in the direction of the first, nozzle-side tool half;
uncoupling a nozzle-side mold plate of the first, nozzle-side tool half from the further elements of the first, nozzle-side tool half and coupling this nozzle-side mold plate to the second, ejector-side tool half;

opening the clamping unit by moving the second, ejector-side tool half in a direction away from the first, nozzle-side tool half;

lifting the slide-in module formed by setting a bridge between the slide-in frames out from the frame tool;

inserting another slide-in module into the frame tool;

closing the clamping unit by moving the second, ejector-side tool half in the direction of the first, nozzle-side tool half;

uncoupling the nozzle-side mold plate from the second, ejector-side tool half and coupling the nozzle-side mold plate to the first, nozzle-side tool half;

opening the clamping unit by detaching the bridge for individualizing the slide-in frames by moving the second, ejector-side tool half in a direction away from the first, nozzle-side tool half; and connecting the nozzle-side slide-in frame to the first, nozzle-side tool half and the ejector-side slide-in frame to the second, ejector-side tool half.

BRIEF DESCRIPTION OF THE DRAWINGS

The invention is explained in more detail below on the basis of an exemplary embodiment along with the accompanying drawings, in which.

DESCRIPTION OF THE EMBODIMENTS

Figure 1:
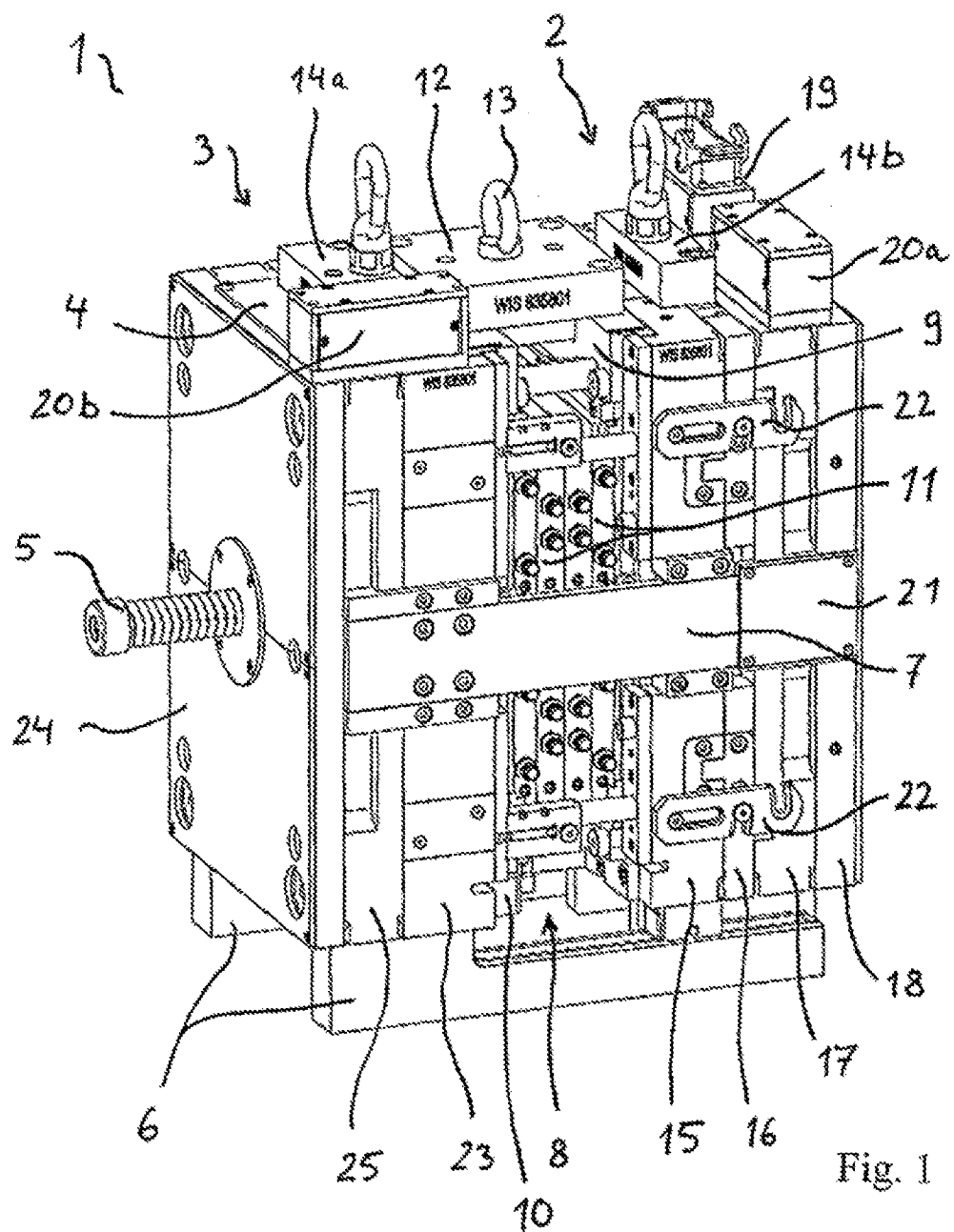
FIG. 1 shows a perspective view of an injection molding tool in the closed state.

FIG. 1 shows a perspective view of an injection-molding tool 1, which has a first, nozzle-side tool half 2, for attachment to a nozzle-side, fixed platen (not represented) of the clamping unit of an injection-molding machine, and a second, ejector-side tool half 3, for attachment to an ejector-side movable platen (not represented) of the clamping unit of the injection-molding machine. From the second, ejector-side tool half 3, a restoring spring 5 connected to an ejector unit 4 (ejector assembly) extends outward, away from the injection-molding tool 1, and, by exertion of a spring force on the ejector assembly, presses it into a starting position.

Fastened to the underside of the second, ejector-side tool half 3 are guiding profiles 6, for example in the form of roller guiding elements, which extend from the second, ejector-side tool half 3 in the direction of the first, nozzle-side tool half 2. The first, nozzle-side tool half 2 rests in a linearly movable manner on the guiding profiles 6, for example by means of sliding mounting, and is supported by the guiding profiles 7.

Furthermore, on both sides of the second, ejector-side tool half 3, guiding profiles 7 extend in the direction of the first, nozzle-side tool half 2. The guiding profiles 7 are cross-sectionally narrow, rectangular metal profiles, which are fastened laterally to the second, ejector-side tool half 3. The first, nozzle-side tool half 2 lies against the guiding profiles 7 and is guided in a linearly movable manner on the guiding profiles 7. The guiding profiles 6 and 7 serve essentially during the assembly of the injection-molding tool 1, and in particular during fitting into the injection-molding machine, as an alignment aid, in order to align the two tool halves 2, 3 exactly parallel to one another.

It can be seen here that the tool halves 2, 3 are aligned perpendicularly in relation to the guiding profiles 6, 7, i.e. stand upright in relation to the guiding profiles 6, 7.

For the production of individual injection-molded parts, an individualized slide-in module 8 is provided and is introduced into the intermediate space between the first, nozzle-side tool half 2 and the second, ejector-side tool half 3. The slide-in module 8 has a nozzle-side slide-in frame 9 and an ejector-side slide-in frame 10 as well as mold inserts 11, which are fitted in the slide-in frames 9, 10. For the modifying process, the slide-in frames 9, 10 are screwed to one another with the aid of a connecting bridge 12 on the upper side. The connecting bridge 12 has an eyelet 13, in order to lift the slide-in module 8 upwardly out from the injection-molding tool 1 for modification. Corresponding handling elements 14a, 14b with assigned eyelets are provided on the first and second tool halves 2, 3, on their respective upper side, so that the first and second tool halves 2, 3 can also be lifted out upwardly from the injection-molding machine by means of a crane after detaching the clamping unit of the injection-molding machine.

The first, nozzle-side tool half 2 is of a multi-part construction and has a nozzle-side mold plate 15 adjacent to the slide-in module 8. The nozzle-side slide-in frame 9 of the slide-in module 8 is adapted to the nozzle-side mold plate 15 such that this nozzle-side slide-in frame 9 can be screwed to the nozzle-side mold plate 15. Also arranged adjacent to the nozzle-side mold plate 15 is a pressure plate 16, which is adjoined by an intermediate plate 17. The intermediate plate 17 has standardized temperature-control circuits for controlling the temperature of the injection-molding tool 1 and carries a standardized hot-runner manifold block with at least one injection-molding nozzle (cannot be seen), which extends in the direction of the second, ejector-side tool half 3. The hot-runner manifold block also has an attachment opening for the machine nozzle of an injection-molding machine and/or an inlet opening for letting in extruded injection-molding material emerging from the machine nozzle, so that a communicating connection of the injection-molding material output of the machine nozzle to the at least one projecting injection-molding nozzle is provided by the hot-runner manifold block. Arranged adjacent to the intermediate plate 17 is a platen 18 for the assembly of the injection-molding tool 1 onto a corresponding platen of the injection-molding machine.

An attachment 19 for the electrical power supply or temperature-control fluid supply required for controlling the temperature may be provided on the upper side of the first, nozzle-side tool half 2. Moreover, on the upper side of the first, nozzle-side tool half 2 and of the second, ejector-side tool half 3 there may respectively be a sensor attachment block 20a, 20b for the electrical attachment of sensors arranged on or in the injection-molding tool 1. These sensor attachment blocks 20a, 20b may optionally have illuminating means, such as light-emitting diodes or displays for indicating the state of the injection-molding tool 1, if appropriate with additional electronics for status monitoring.

Such sensors may be, for example, measuring units 21, which are arranged on at least one side of the first, nozzle-side tool half 2 and interact with an assigned lateral guiding profile 7. In the closed state of the injection-molding tool 1, the free end of the lateral guiding profile 7 butts against the measuring unit 21, the distance between the guiding profile 6 and the measuring unit, in this case configured as a length-measuring unit 21, being monitored during the injection-molding process and, if there is a change in the distance, an insufficient clamping force being detected.

Furthermore, the location and/or positions of the movable subassemblies can be sensed by the sensors, for example whether the ejector assembly has reached the end positions, so that these items of information can be processed by the machine control.

It can also be seen that the first, nozzle-side tool half 2 has locking levers 22, which are pivotably arranged on the side wall of the nozzle-side mold plate 15. With the aid of the locking levers 22, the nozzle-side mold plate 15 in the operating state represented can be fixedly connected to the further plates, i.e. the pressure plate 16, the intermediate plate 17 and the platen 18, in that the locking levers 22 are pivoted in the direction of the intermediate plate 17 and are engaged in latching pins projecting from the intermediate plate 17. This latching state may be monitored, for example, by means of sensors.

For the modifying process, the locking levers 22 may be detached from the intermediate plate 17 and connected to projecting latching pins of the second, ejector-side tool half 3, so that the second, ejector-side tool half 3 forms a unit together with the nozzle-side mold plate 15, while leaving an intermediate space for the slide-in module 8, while the remaining plates 16, 17, 18 of the first, nozzle-side tool half 2 with the hot-runner manifold block located therein, which remains attached to the injection-molding machine, are moved away from this unit.

It can also be seen that the second, ejector-side tool half is likewise of a multi-part configuration and has an ejector unit 4, which is fastened opposite the slide-in module 8 to an ejector-side mold plate 23, which is designed for carrying the ejector-side slide-in frame 10 of the slide-in module 8 and for leading through ejector elements of the ejector unit 4. The ejector-side tool half 3 is connected by a platen 24 to a corresponding platen of the injection-molding machine. The ejector unit 4 is arranged between the ejector-side platen 24 and the ejector-side mold plate 23, spacing strips 25 being provided laterally on both sides between the ejector-side platen 24 and the ejector-side mold plate 23.

Figure 2:
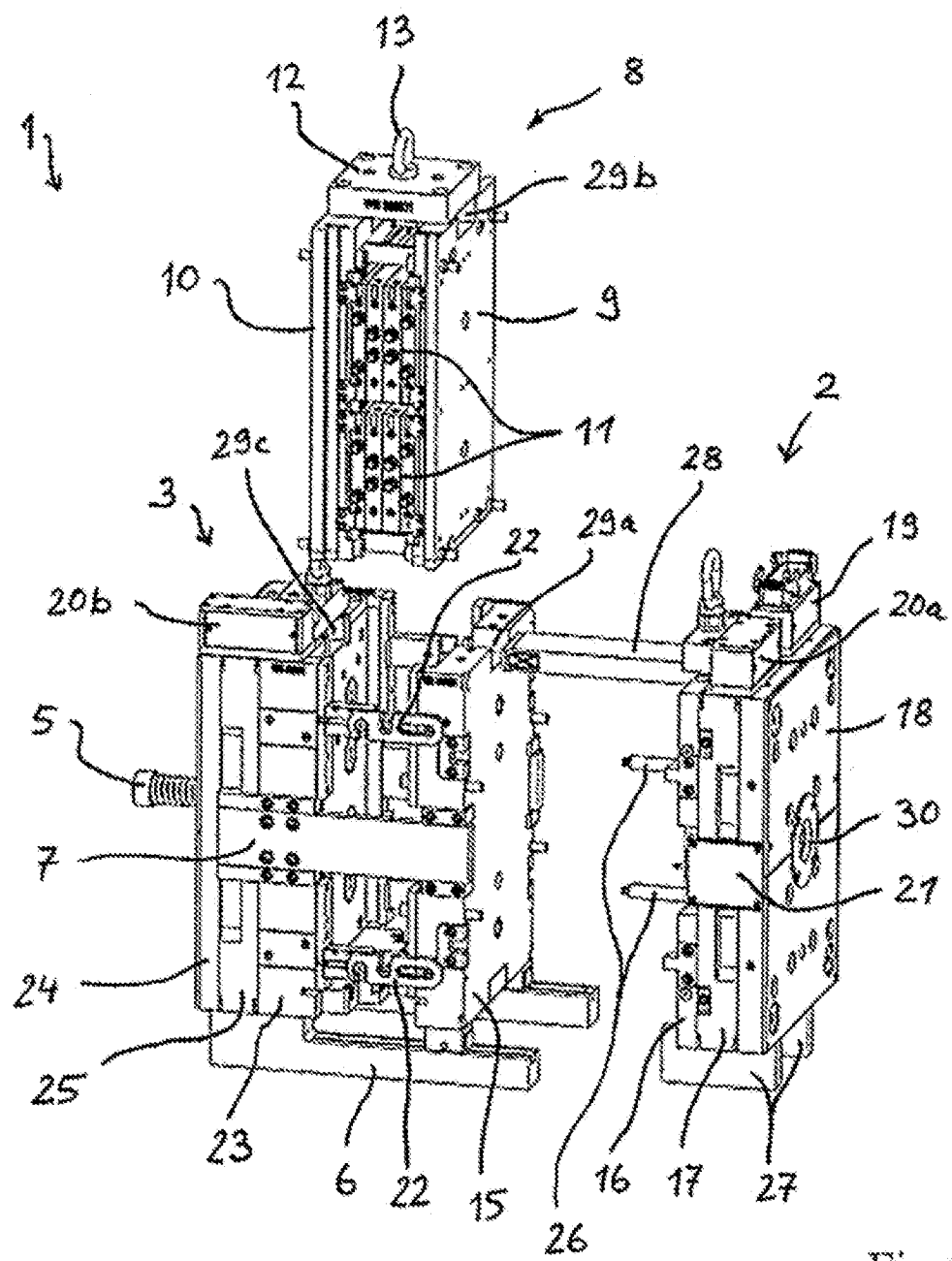
FIG. 2 shows a perspective view of the injection molding tool from FIG. 1 in the opened state with the slide-in module lifted out.

FIG. 2 shows a perspective representation of the injection-molding tool 1 from FIG. 1 in the modifying process. It is clear that the locking levers 22 of the nozzle-side mold plate 15 are now connected to the second, ejector-side tool half 3. In this case, the nozzle-side mold plate 15 of the first, nozzle-side tool half 2 is resting on the lower guiding profiles 6 of the second, ejector-side tool half 3 and is held laterally by the lateral guiding profiles 7.

The remaining plates 16, 17 and 18 of the first, nozzle-side tool half 2 have been separated so far from the second, ejector-side tool half 3 that the injection-molding nozzles 26 of the hot-runner manifold block (not visible) protruding from the pressure plate 16 and the intermediate plate 17 have been pulled out from the nozzle-side mold plate 15, and in particular from the slide-in module 8. Consequently, the slide-in module 8 can be pulled out upwardly from the intermediate space between the nozzle-side mold plate 15 and the second, ejector-side tool half 3 in the way represented.

The nozzle-side pressure plate 16 along with the intermediate plate 17 attached thereto and the hot-runner manifold block accommodated therein as well as the nozzle-side platen 18 rest on standing feet 27 screwed to them.

It can also be seen that, in the upper region of the first, nozzle-side tool half 2, a further, upper guiding profile 28 protrudes in the direction of the second, ejector-side tool half 3. In the nozzle-side mold plate 15 and on the upper edge of the slide-in module 8 there are machined clearances adapted thereto in the form of slots 29a, 29b. On the ejector-side tool half 3 there is a slot 29c, which is entered by the upper guiding profile 28, in order to center the first, nozzle-side tool half 2 precisely on the second, ejector-side tool half 3.

There can also be seen an inlet opening 30 of the standardized hot-runner manifold bar for the attachment of the machine nozzle of an injection-molding machine, which serves for introducing extruded injection-molding material into the hot-runner manifold bar.

It is clear that the first and second tool halves 2, 3 are standardized and that a slide-in module 8 individualized for producing specific molded parts can be introduced into these two standardized tool halves 2, 3 from above.

However, it is conceivable that a limited number of different standardized tool halves 2, 3 with a different arrangement, and if appropriate a different number, of injection-molding nozzles 26, and if appropriate with a different embodiment of the ejector unit 4, may be provided. In this way, standardized tool halves 2, 3 can be provided for different sizes of molded parts and numbers of cavities.

For the production of new molded parts, all that is additionally needed is a slide-in module 8 adapted thereto, and if appropriate a mold insert adapted thereto, according to requirements. This makes a scaled production of the slide-in modules 8 possible, by individualized adaptation of the mold inserts 11 on the basis of a standardized slide-in module 8. These mold inserts 11 may likewise first be prefabricated in a standardized form without a cavity and only have to be re-worked for the individualized adaptation to a specific mold tool. This shortens the production times for injection-molding tools 1 considerably and also leads to a significant cost reduction.

Figure 3:
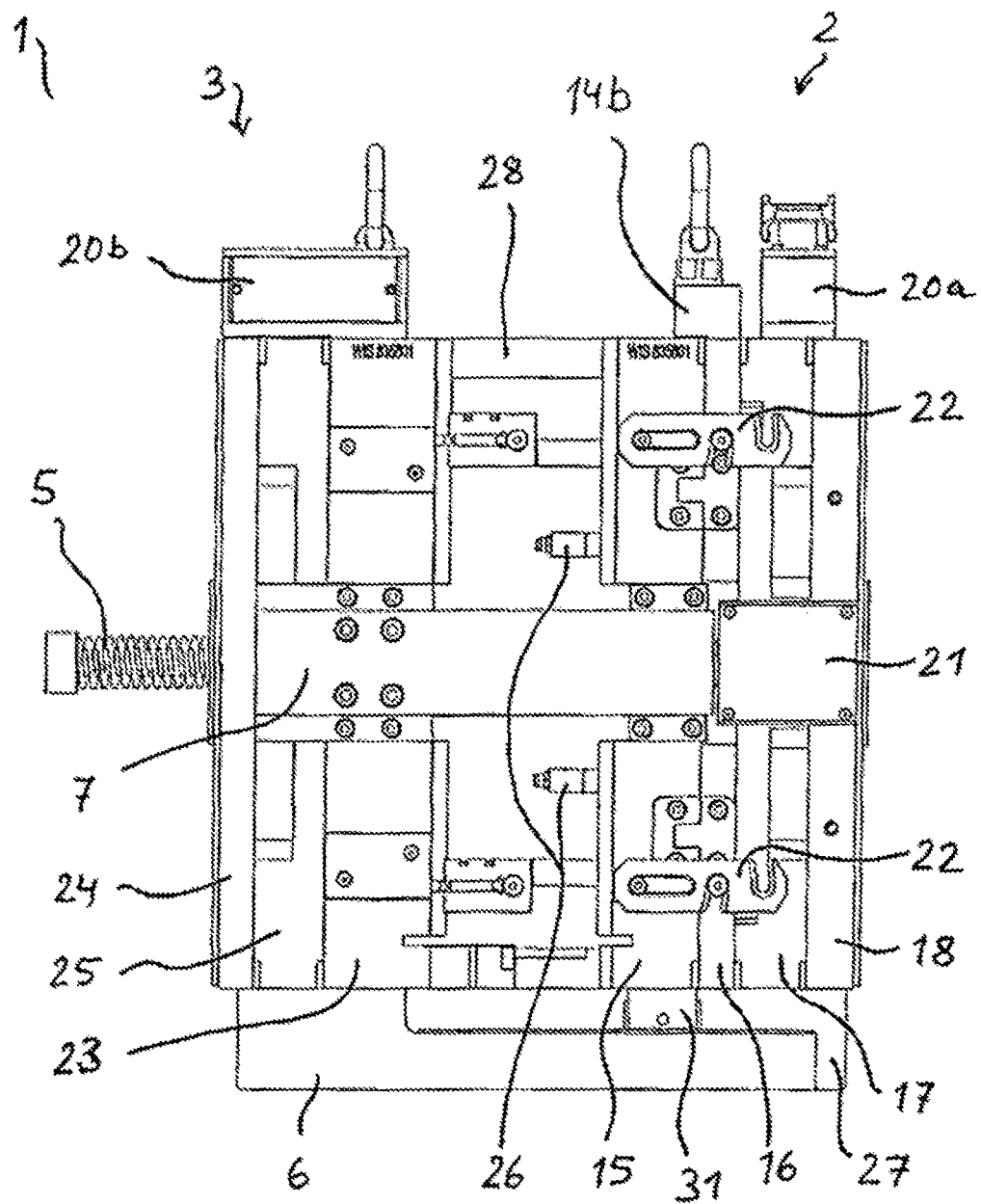
FIG. 3 shows a side view of the closed injection-molding tool from FIG. 1 in a side view without a slide-in module.

FIG. 3 shows a side view of the injection-molding tool 1 from FIGS. 1 and 2 in the operating state without a slide-in module 8. In this case, the first and second tool halves 2, 3 have been moved together and the nozzle-side mold plate 15 has been latched together with the pressure plate 17 with the aid of the locking levers 22.

It is clear that the nozzle-side mold plate 15 is mounted in a linearly movable manner on the lower guiding profiles 6 with the aid of a sliding foot 31. The further plates 16, 17 and 18 of the first, nozzle-side tool half 2 are resting on common standing feet 27.

Figure 4:
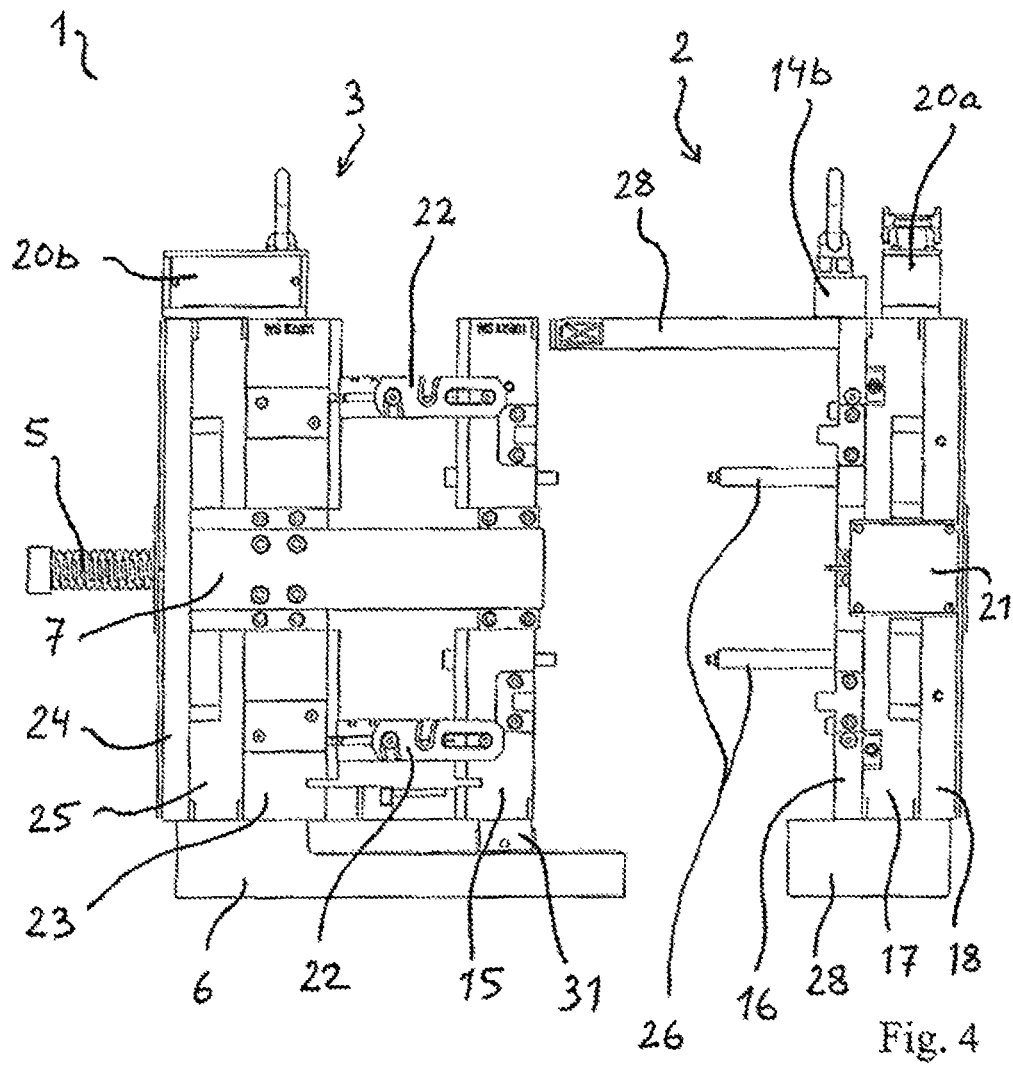
FIG. 4 shows a side view of the injection-molding tool without a slide-in module, opened in the modifying process.

FIG. 4 shows the injection-molding tool 1 from FIG. 2 without a slide-in module 8 in the modifying process. It is clear that, during the modifying process, the nozzle-side mold plate 15 is connected to the second, ejector-side tool half 3 by latching of the locking levers 22 of the nozzle-side mold plate 15 together with said tool half. By pivoting the locking levers 22, the nozzle-side mold plate 15 of the first, nozzle-side tool half 2 is detached for this purpose from the further plates 16, 17, 18 of the first, nozzle-side tool half 2. The second, ejector-side tool half 3 can therefore be moved away from the further plates 16, 17 and 18 of the first, nozzle-side tool half 2, which are connected to the fixed platen of the injection-molding machine and are likewise fixed, whereby the slide-in module 8 previously lying between them is freed and can be lifted out upwardly. This correspondingly creates a free space, into which a new slide-in module 8 can be inserted from above.

Figure 5:
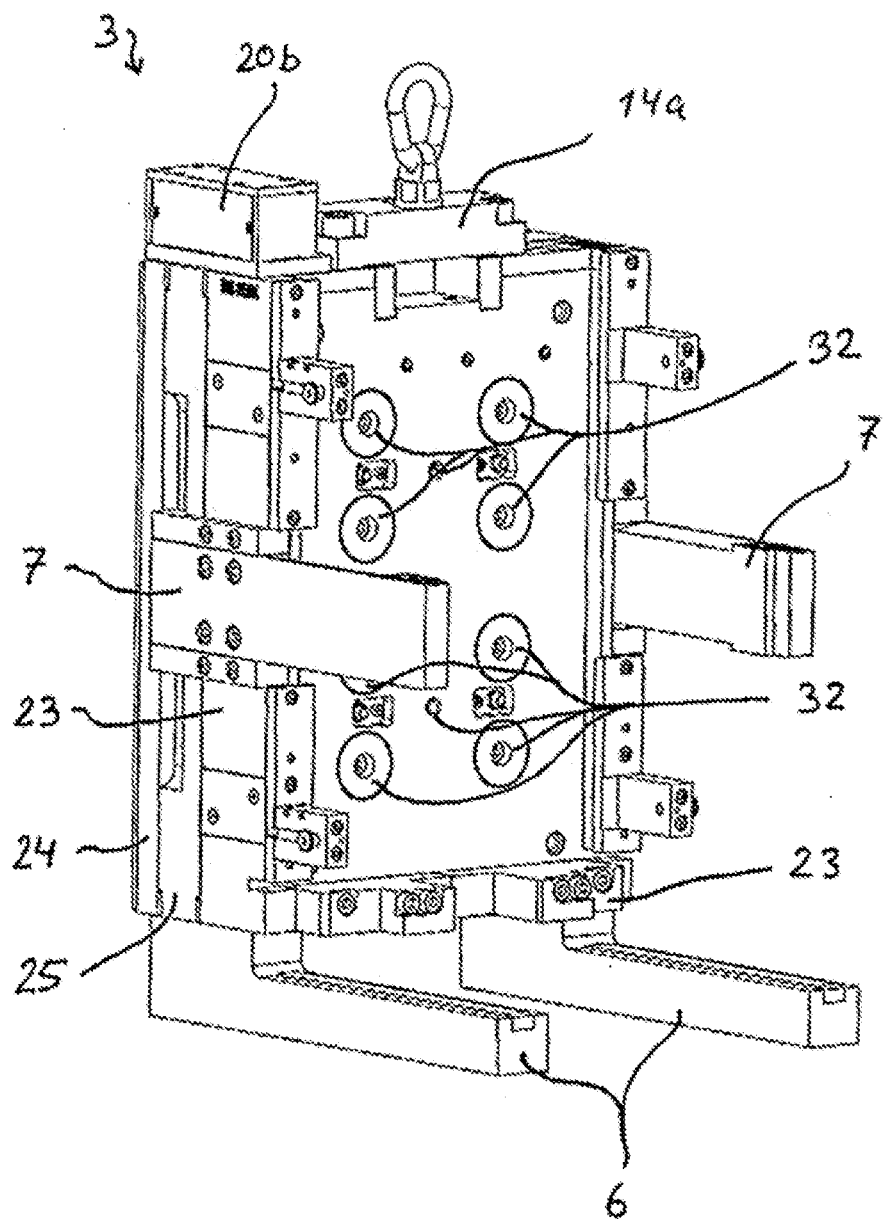
FIG. 5 shows a perspective view of the second, ejector-side tool half.

FIG. 5 shows a perspective view of the second, ejector-side tool half 3. It is clear that a number of ejector elements 32 in the form of ejector rollers are mounted in a linearly movable manner in the ejector-side mold plate 23 and protrude with their free end in the direction of the first, nozzle-side tool half 2. Provided in the lower region of the ejector-side mold plate 23 are bearing and guiding elements 33, which protrude forward and serve for bearing a slide-in frame of the slide-in module 8.

It can also be seen that cross-sectionally rectangular guiding profiles 7 protrude forward in the direction of the first, nozzle-side tool half 2 laterally from the second, ejector-side tool half 3.

Similarly, the lower guiding profiles 6 with the roller guides for mounting the nozzle-side mold plate 15 can be seen.

Figure 6:
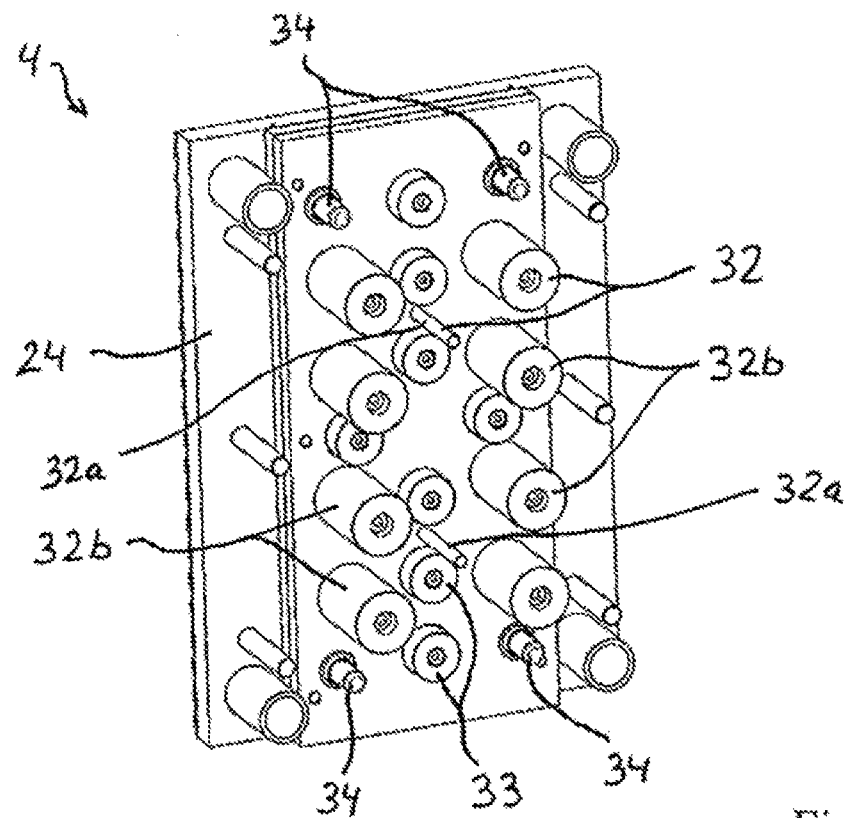
FIG. 6 shows a perspective view of the ejector unit of the second, ejector-side tool half from FIG. 5.

FIG. 6 shows a perspective front view of a standardized ejector unit 4 of the second, ejector-side tool half 3. It can be seen that linearly movable pin-like ejector rollers 32a and cylindrical ejector rollers 32b protrude forward from the ejector unit 4. Furthermore, supporting rollers 33 are provided offset inward, with a smaller length, enter assigned clearances in the ejector-side mold plate 23 and are connected to an ejector-side platen 24. The supporting rollers 33 serve for supporting the ejector-side tool half 3 and the slide-in frame 10 located therein.

The centered mounting of the ejector unit 4 on the ejector-side platen 24 takes place by means of ball guides 34.

With electromechanical or hydraulically actuated, length-variable actuators, a relative movement of the ejector unit with respect to the ejector-side mold plate 23 is achieved, so that the ejector elements 32, i.e. the ejector rollers 32a, 32b, protrude from the ejector-side mold plate 23 in the actuated state.

Figure 7:
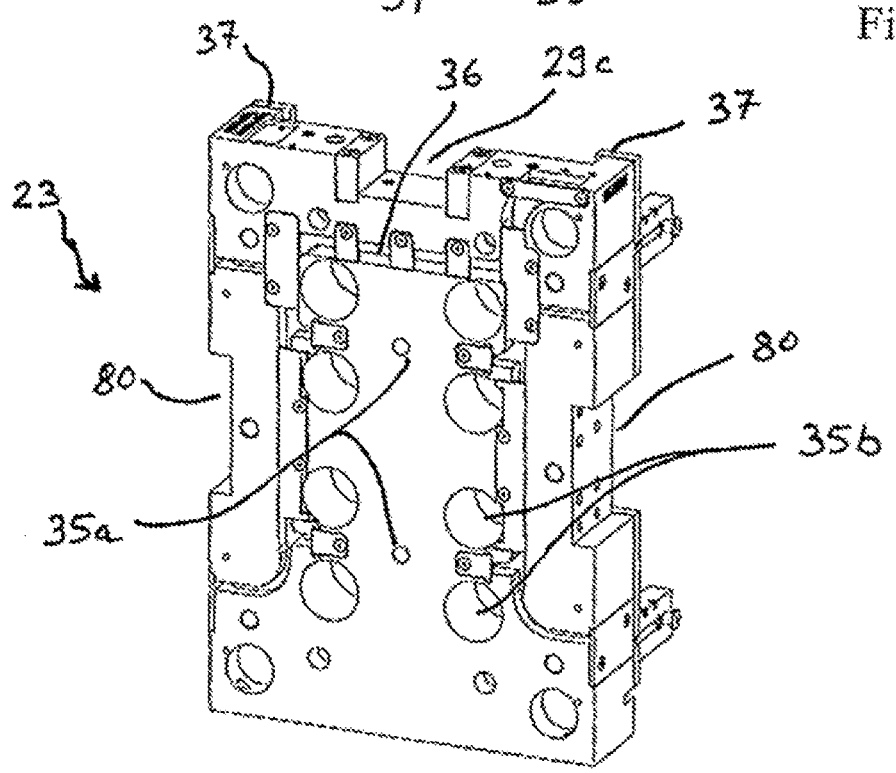
FIG. 7 shows a perspective view of the ejector-side mold plate of the second, ejector-side tool half with depressions for receiving electrical equipment including sensors.

FIG. 7 shows a representation of the ejector-side mold plate 23 in a perspective view. It is clear that bores 35a, 35b are provided for the ejector rollers 32a, 32b. Furthermore, on the rectangular sides there are clearances 80 for receiving the guiding profiles 7. Moreover, channels 36 for receiving electrical wiring and for fitting sensors have been introduced into the ejector-side mold plate 23. Sliding guides 37 for the sliding in of the ejector-side slide-in frame 10 of a slide-in module 8 from above and for holding the same on the ejector-side mold plate 23 can also be seen.

Figure 8:
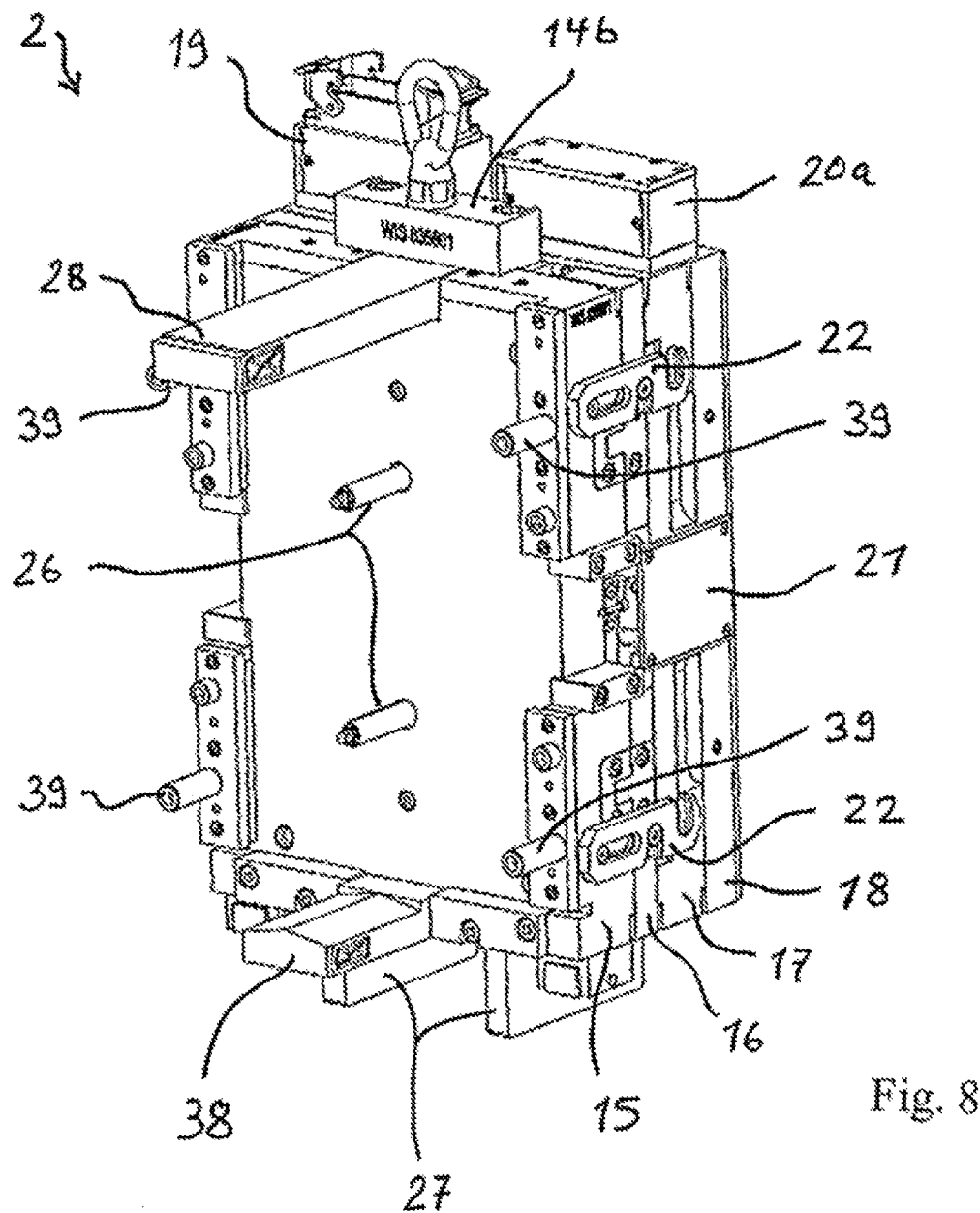
FIG. 8 shows a perspective view of the nozzle-side tool half.

FIG. 8 shows a perspective front view of the first, nozzle-side tool half 2. It is clear that not only an upper guiding profile 28 protrudes in the upper region but also, parallel thereto, a lower guiding profile 38 is provided in the lower region and extends forward, parallel to the upper guiding profile 28.

The injection-molding nozzles 26, which protrude from the nozzle-side mold plate 15, can also be seen. It is also clear that laterally spring-loaded spacing elements 39 protrude from the nozzle-side mold plate 15 in the direction of the second, ejector-side tool half 3. With the aid of these spring-loaded spacing elements 39, a defined intermediate space for the slide-in module 8 during the moving of the nozzle-side mold plate 15 in the direction of the second, ejector-side tool half 3 can be set.

Figure 9:
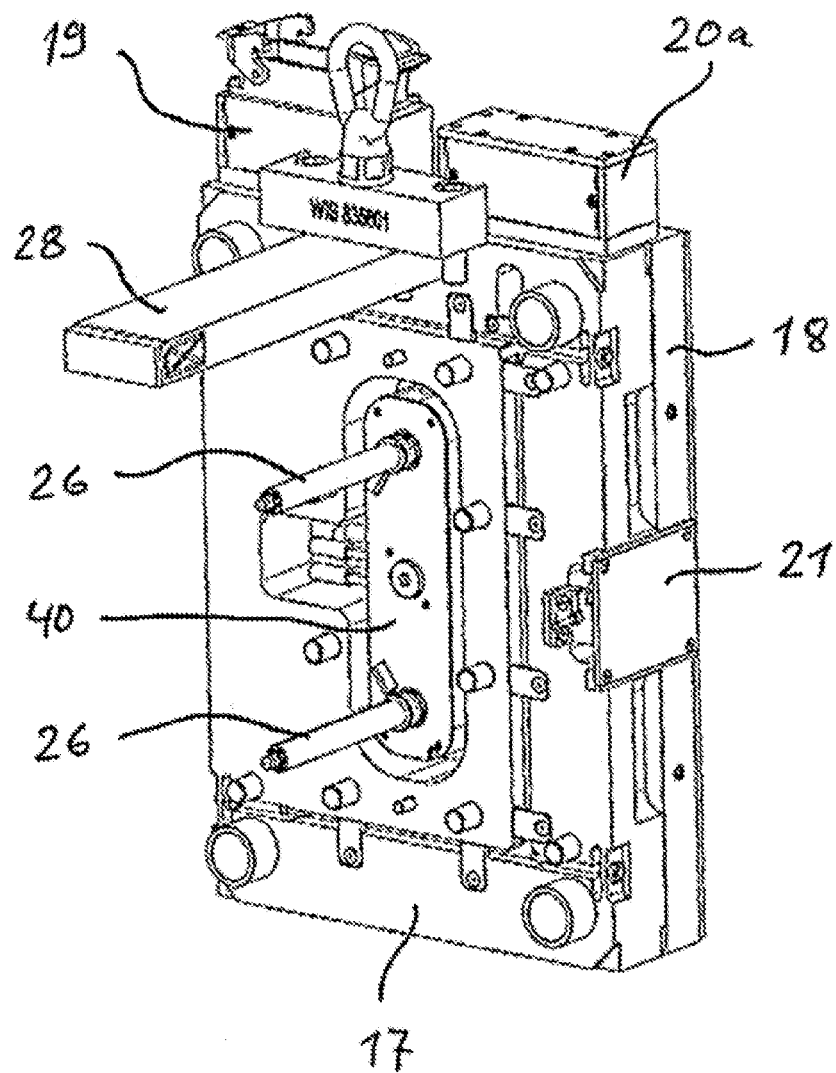
FIG. 9 shows a perspective view of the nozzle-side tool half from FIG. 8 with the nozzle-side mold plate removed.

FIG. 9 shows a perspective front view of the intermediate plate 17 with the standardized hot-runner manifold bar 40 arranged therein as well as the platen 18 of the first, nozzle-side tool half 2 lying behind said bar. The hot-runner manifold bar 40 has in the region of the platen 18 a central inlet opening (not visible, inlet opening 30 in FIG. 1) for the attachment of the machine nozzle of an injection-molding machine, which is adjoined by a runner to the injection-molding nozzles 26.

Figure 10:
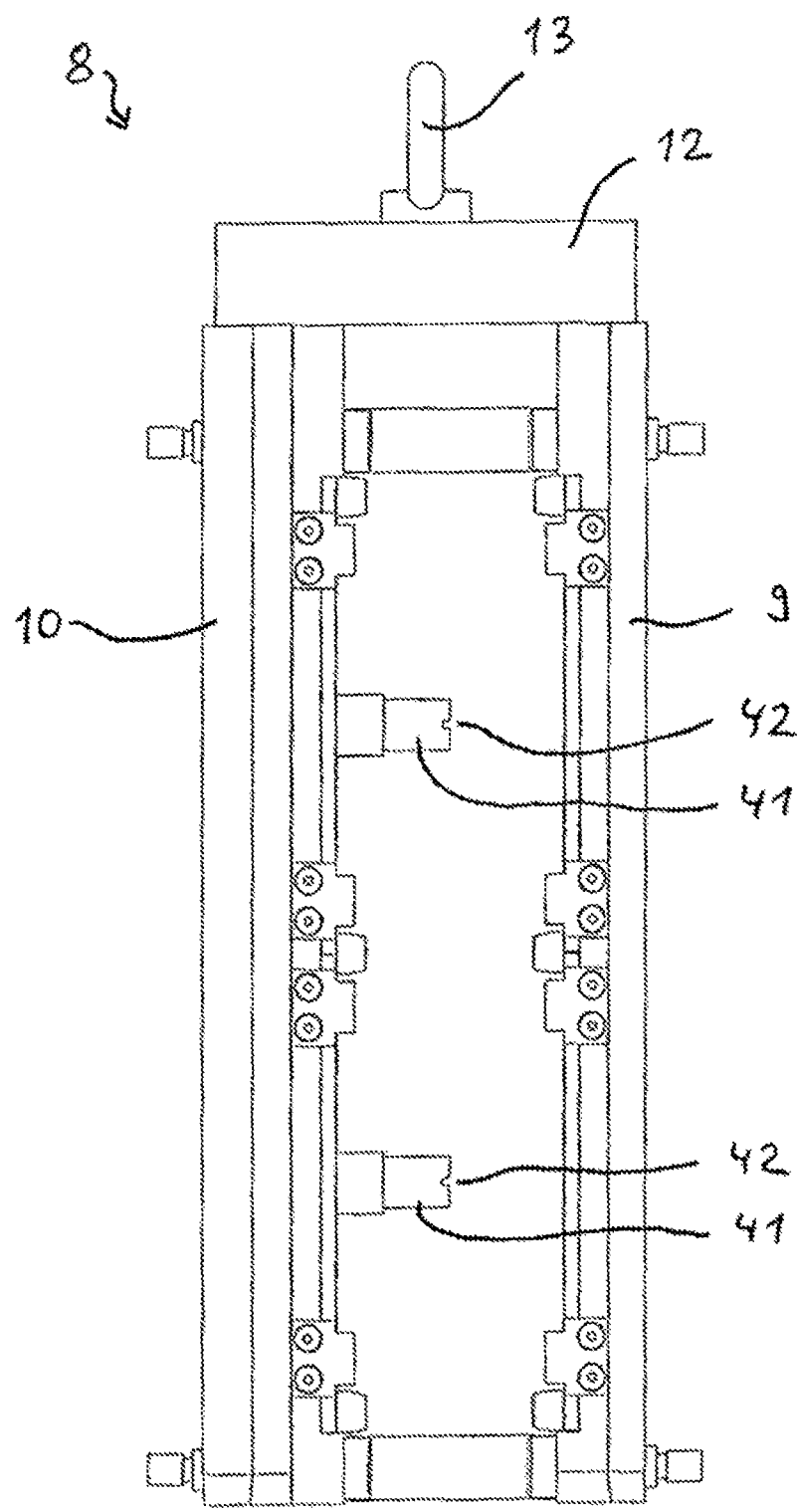
FIG. 10 shows a side view of the slide-in module with a nozzle-side slide-in frame and an ejector-side slide-in frame.

FIG. 10 shows a nozzle-side slide-in frame 9 and an ejector-side slide-in frame 10 without mold inserts 11 lying in between. The two slide-in frames 9, 10 are connected with the aid of the upper connecting bridge 12 to form a uniform slide-in module 8. For this purpose, the upper connecting bridge 11 is screwed to the slide-in frames 9, 10 from above.

It is also clear that injection-molding manifold heads 41 extend from the ejector-side slide-in frame 10 in the direction of the nozzle-side slide-in frame 9. Runners 42 have been introduced into these injection-molding manifold heads 41, at their free head ends. When the injection-molding tool 1 is closed, the free end of an injection-molding nozzle 26 is moved toward an assigned injection-molding manifold head 41, so that the tip of the injection-molding nozzle 26 is located directly opposite the free head end of an assigned injection-molding manifold head 41. The injection-molding material emerging from the injection-molding nozzle 26 consequently passes into the runners 42 and is distributed from there into adjacent mold inserts 11. The injection-molding manifold heads 41 are preferably rotatable, for example in built-in increments of 15° at a time, so that the alignment of the runners 42 can be set to the number of mold inserts 11 that are present and to the position of injection-molding material inlets in the mold inserts 11.

Figure 11:
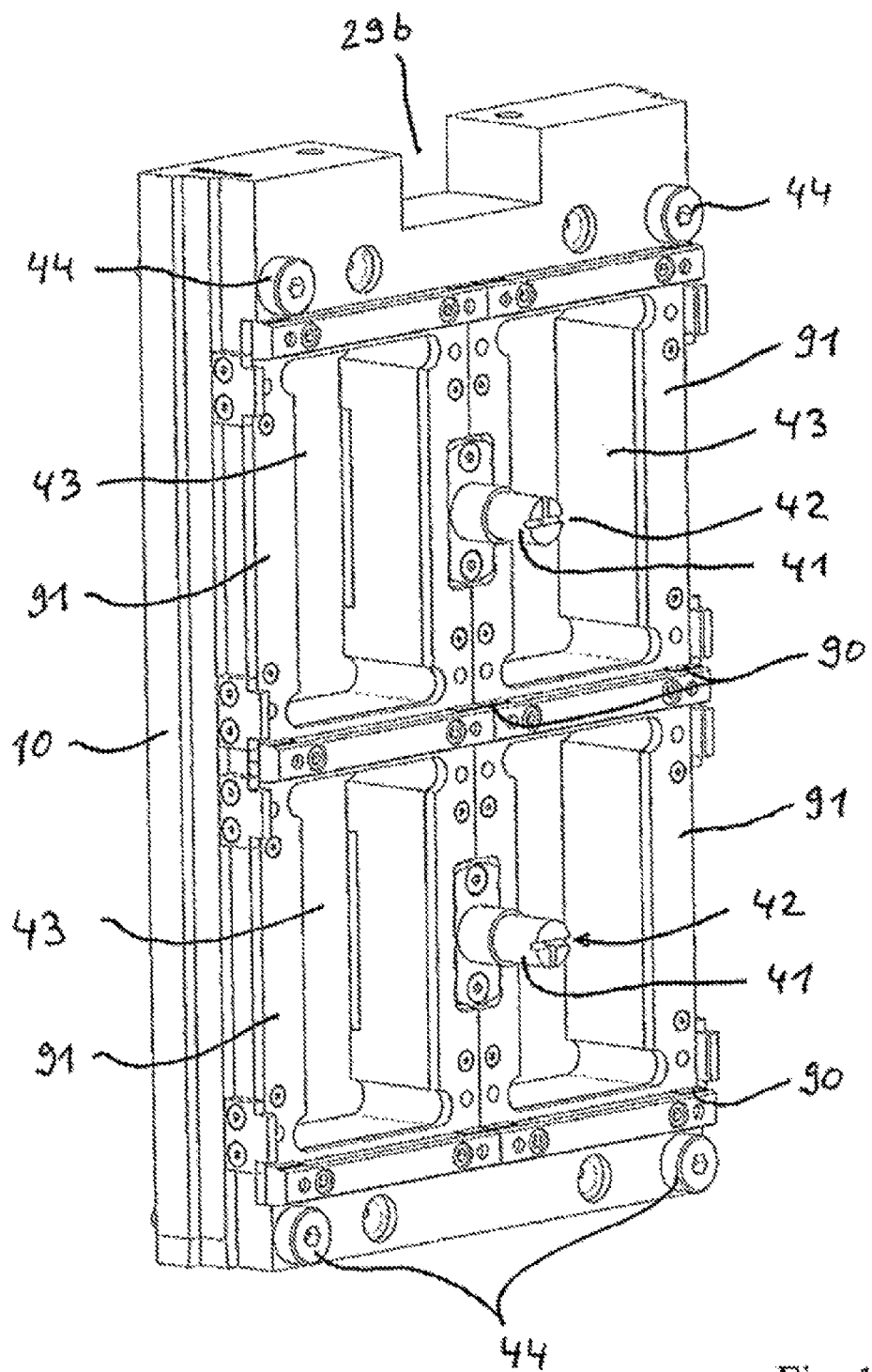
FIG. 11 shows a perspective view of the ejector-side slide-in frame of the slide-in module from FIG. 10.

FIG. 11 shows a perspective view of the ejector-side slide-in frame 10. It is clear here that the slide-in frame 10 has a number of receiving openings 43 for receiving part of a mold insert 11. In particular, the receiving openings serve for receiving an ejector unit of an individual mold insert 11. The ejector-side mold insert half is fixedly connected to the ejector-side slide-in frame 10, for example by screwing.

To reduce the heat transfer from the slide-in frames 9, 10 to the respective mold insert 10, it is advantageous if there are on the slide-in frames 10 spacing panels 90 and/or heat-insulating intermediate layers 91, which lie between mold inserts 11 and slide-in frames 9, 10.

It can also be seen that the slide-in frame 10 has fitting screws 44, which are led through bores and with which the ejector-side slide-in frame 10 can be fixedly connected to that of the second, ejector-side tool half 3 once the slide-in module 8 has been inserted into the intermediate space between the first and second tool halves 2, 3.

Figure 12:
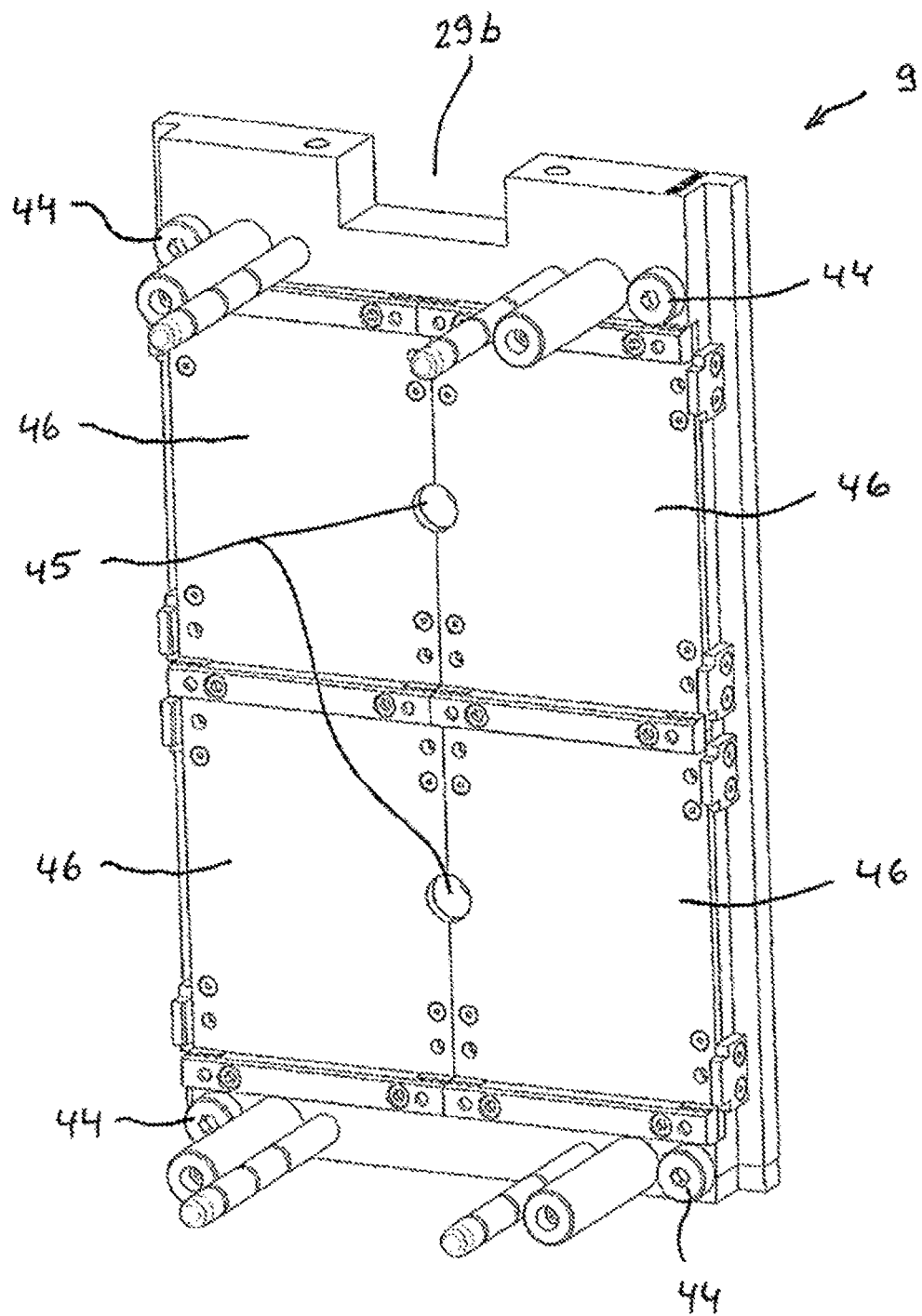
FIG. 12 shows a perspective view of the nozzle-side slide-in frame of the slide-in module from FIG. 10.

FIG. 12 shows a perspective view of a nozzle-side slide-in frame 8. It is clear that there are openings 45 for leading through the at least one injection-molding nozzle 26 of the first, nozzle-side tool half 2. It is also clear that heat-insulating panels 46, with which the heat transfer from the tool half 2 to the mold inserts 11 is restricted, are attached to the upper side of the slide-in frame 9. Here, too, fitting screws 44 led through bores are provided, in order to screw the nozzle-side slide-in frame 9 to the first, nozzle-side tool half 2.

Figure 13:
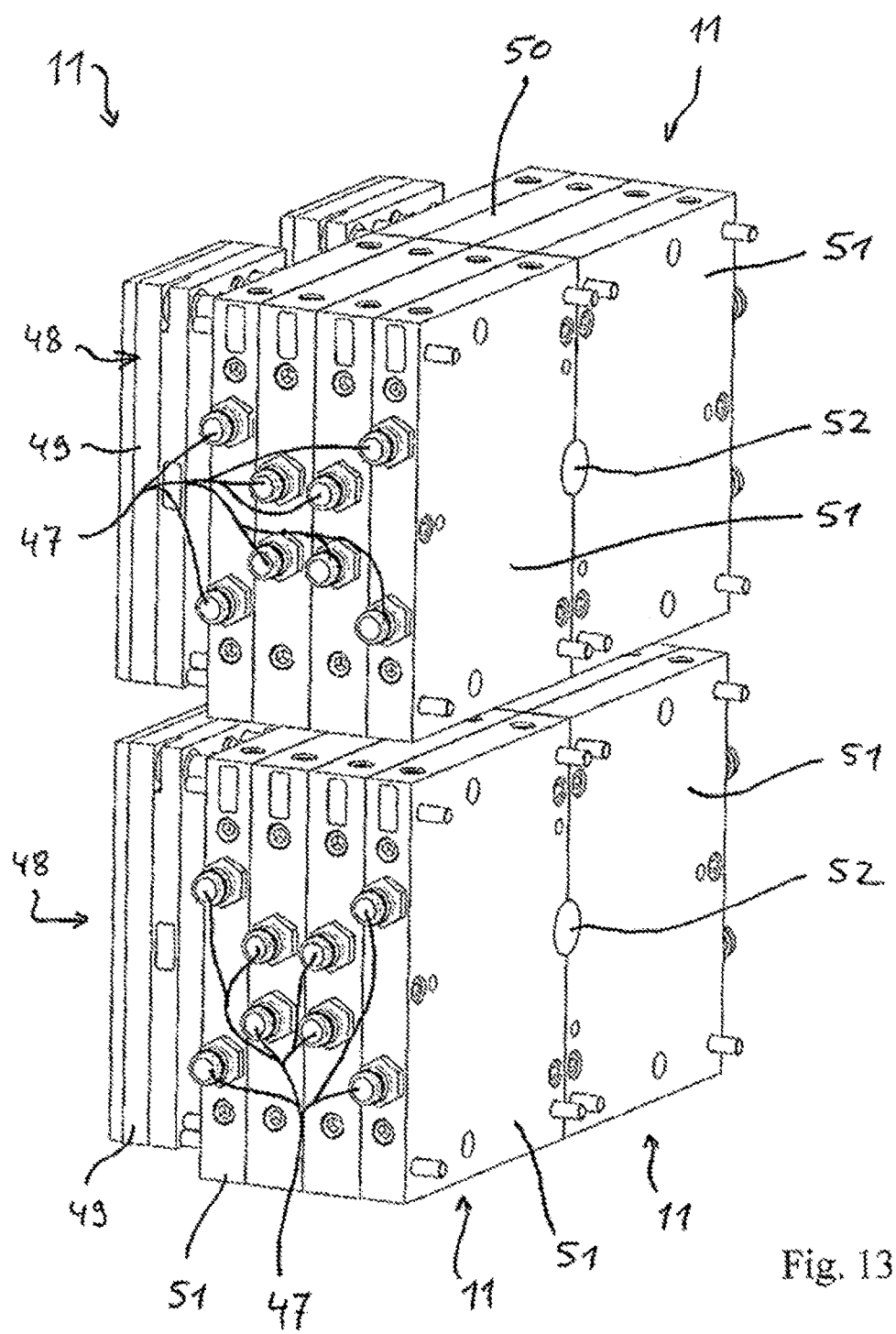
FIG. 13 shows a perspective view of four mold inserts respectively consisting of two mold insert halves for fitting into the slide-in frame from FIG. 10.

FIG. 13 shows a perspective view of four mold inserts 11. It is clear that on a side wall of the mold inserts 11 there protrude attachment connectors 47, which serve for the attachment of fluid lines. Via the attachment connectors 47, fluid can be conducted through temperature-control channels of the mold inserts 11 for cooling or heating.

It is also clear that the mold inserts 11 respectively have at least one ejector unit 48 with an ejector assembly 49, which units are actuated by way of the ejector elements 32 of the second, ejector-side tool half 3.

It can also be seen that the mold inserts 11 have a first, ejector-side mold insert half 50 and a second, nozzle-side mold insert half 51, which in the closed state represented lie on one another and in the opened state can be moved away from one another.

It can also be seen that the nozzle-side mold insert halves 51 have injection-molding nozzle insertion openings 52 for inserting an injection-molding nozzle 26 of the first, nozzle-side tool half 2.

Figure 14:
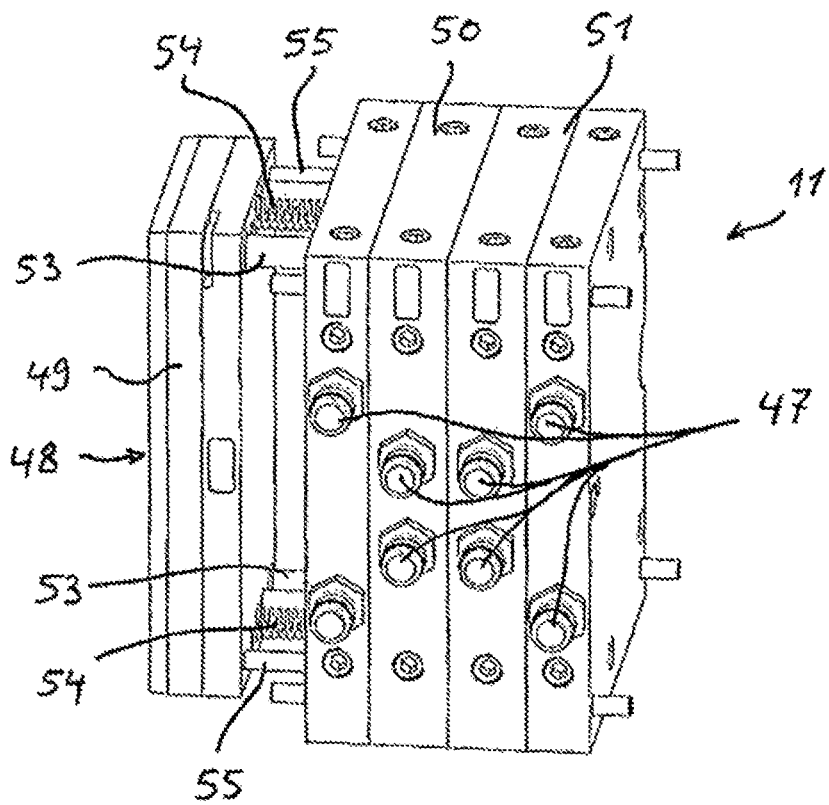
FIG. 14 shows a perspective view of a mold insert from the supply attachment side.

FIG. 14 shows a mold insert 11 from FIG. 13 from the supply attachment side. Clear here are the attachment connectors 47 on the side wall of the mold insert halves 50, 51.

It can also be seen that the ejector unit 48 has an ejector assembly 49, which is movably guided on the ejector-side mold insert half 50 by means of guiding pins 53. Restoring springs 54 are used to achieve the effect that the ejector assembly 49 moves away from the ejector-side mold insert half 50 when it is not being pressed in the direction of the ejector-side mold insert half 50 by an assigned ejector element 32 of the second, ejector-side tool half 3.

Restoring pins 55 are also provided to protect individualized ejector pins (not represented) and the cavities. Individualized ejector pins (not represented) are used to eject a molded part from the mold insert 11.

Figure 15:
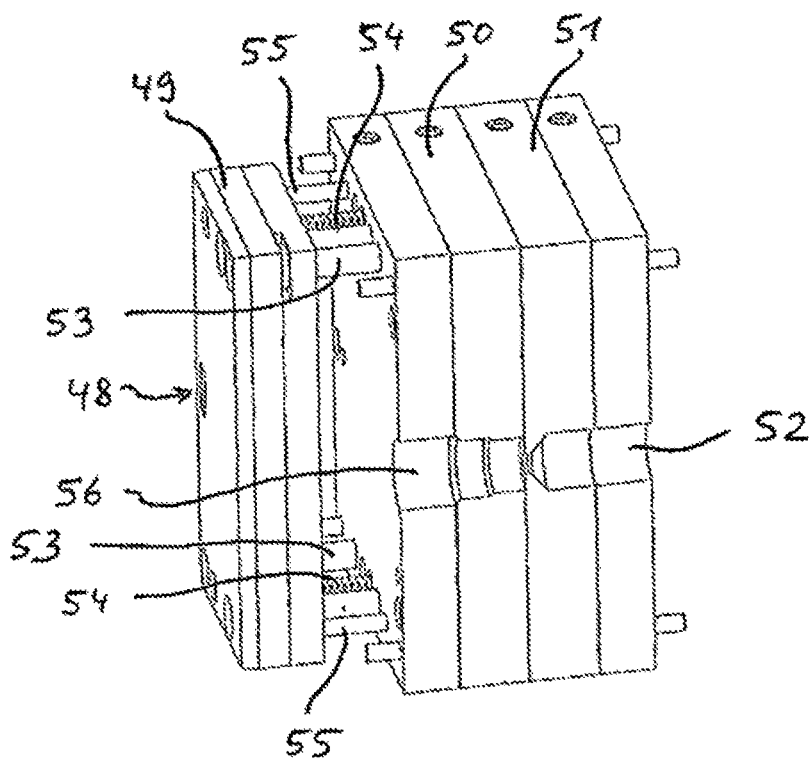
FIG. 15 shows a perspective view of the mold insert from FIG. 14 from the injection side.

FIG. 15 shows the mold insert 11 from FIGS. 13 and 14 from the injection side. It is clear that an injection-molding nozzle insertion opening 52 is provided, this opening being semicircular in the exemplary embodiment represented and matching up with an adjacent mold insert 11 to form a complete circular injection-molding nozzle insertion opening 52. Also conceivable, however, are embodiments in which a mold insert 11 has a cylindrical injection-molding nozzle insertion opening 52, so that the injection-molding nozzle 26 completely enters a single mold tool 11 and not, as in the present case, two mold tools 11 arranged one next to the other.

Opposite the injection-molding nozzle insertion opening 52 and in alignment with it, an injection-molding manifold head insertion opening 56 has been introduced into the ejector-side mold insert half 50. In this way it is ensured that the free head end of the injection-molding manifold head 41 lies directly adjacent to and opposite the free end of an injection-molding nozzle 26, so that injection-molding material can flow into runners 42 at the free head end of the injection-molding manifold nozzle 41. In this border region between the two mold insert halves 50, 51, injection-molding material runners are provided, leading into cavities and opening out into the insertion openings 52 and/or 56.

Figure 16:
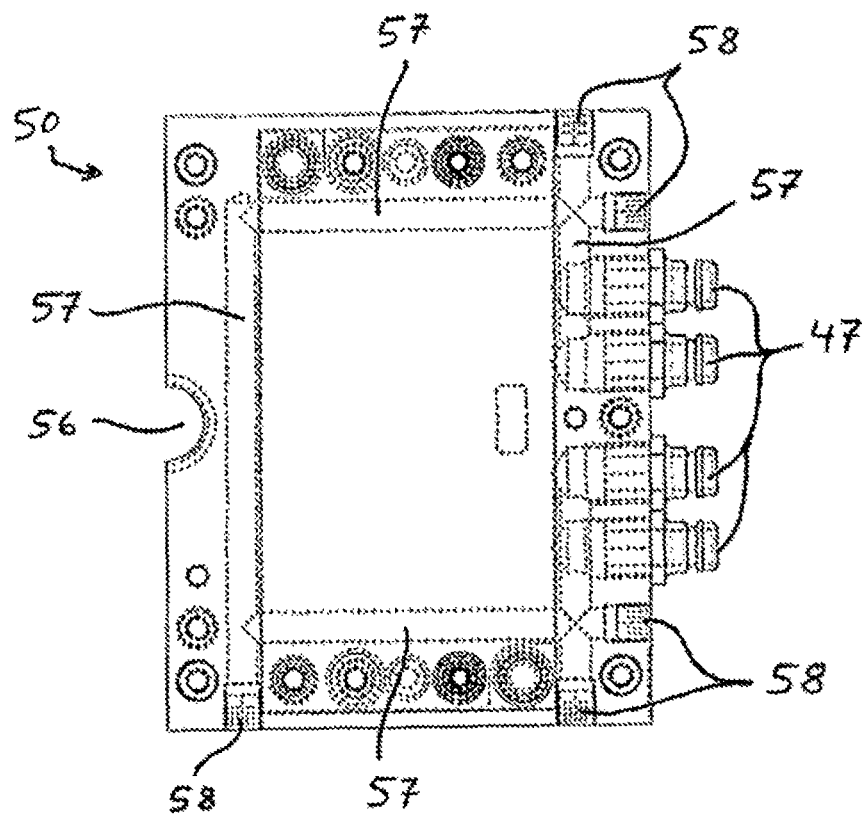
FIG. 16 shows a plan view of part of the ejector-side mold insert half with temperature-control channels introduced therein and inlet/outlet openings with attachment connectors attached thereto.

FIG. 16 shows a plan view of the inner side of a part on the ejector-side mold insert half 50. It is clear that a temperature-control channel 57, which is connected in a communicating manner from the attachment side to the attachment connector 47 and runs around the mold insert half 50, has been introduced on the inner side. The straight portions of the temperature-control channel 57 produced by drilling end in drilled holes 58, which are closed.

Figure 17:
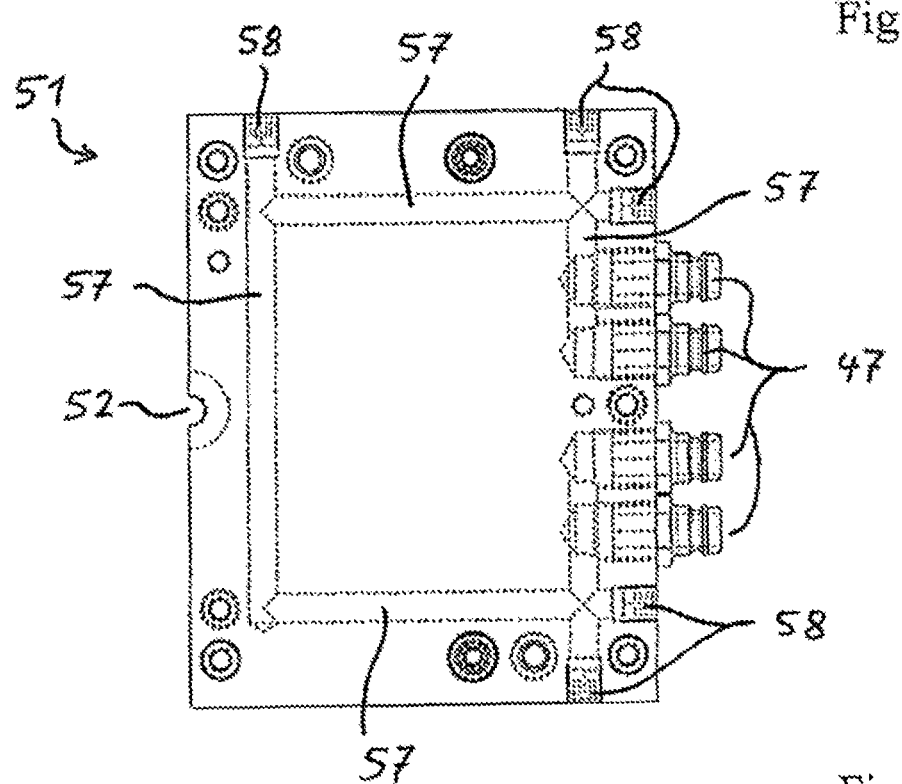
FIG. 17 shows a plan view of part of the nozzle-side mold insert half with temperature-control channels and standardized inlet/outlet openings introduced therein and attachment connectors attached thereto.

FIG. 17 shows a corresponding plan view of the inner side of a part of the nozzle-side mold insert half 51. Here, too, a temperature-control channel 57 has been introduced peripherally and a plurality of fluid inlet/outlet openings provided with attachment connectors 47 are provided.

Figure 18:
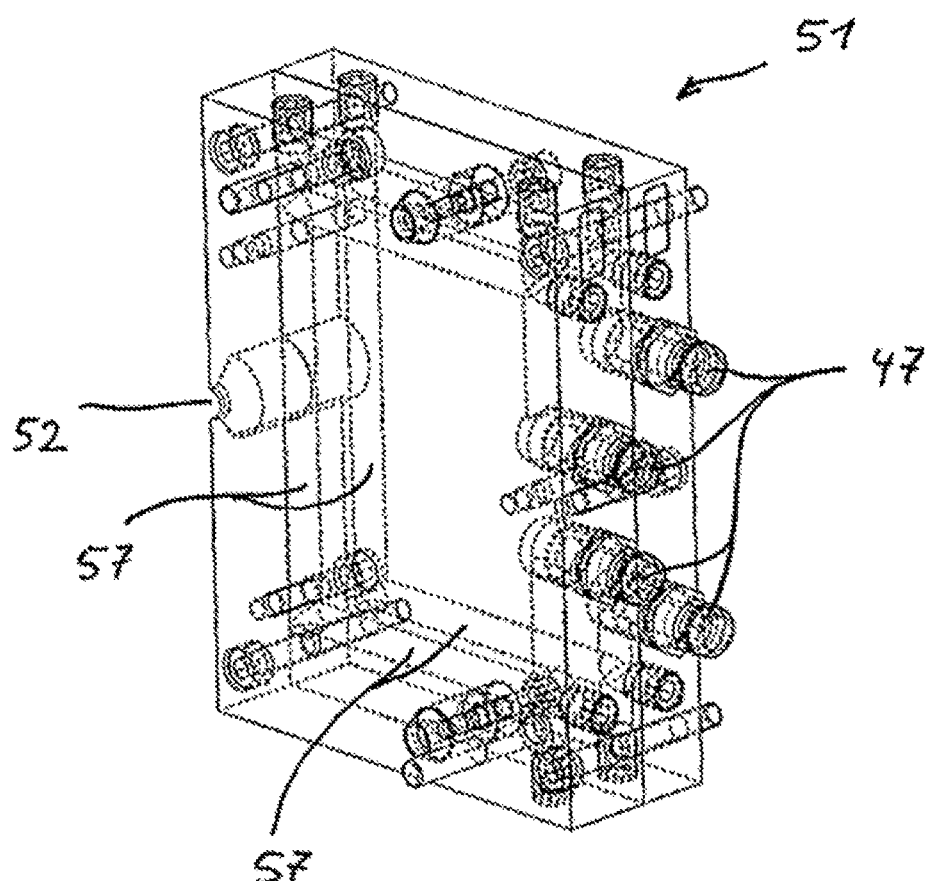
FIG. 18 shows a perspective view of the nozzle-side mold insert.

FIG. 18 shows a perspective view of the nozzle-side mold insert half 51. It is clear from the semitransparent view that temperature-control channels 57 have been introduced into the inner space of the two screwed-together parts of the mold insert halves 51.

Thus, an individual cavity for producing an individual molded part may be introduced into the upper side that can be seen of the mold insert half 51. This may take place in a way known per se by milling, electrical discharge machining or the like. For the introduction of injection-molding material into such a cavity, the introduction of an injection-molding runner from the runners of the injection-molding manifold head is required. Direct gating is also possible.

Figure 19:
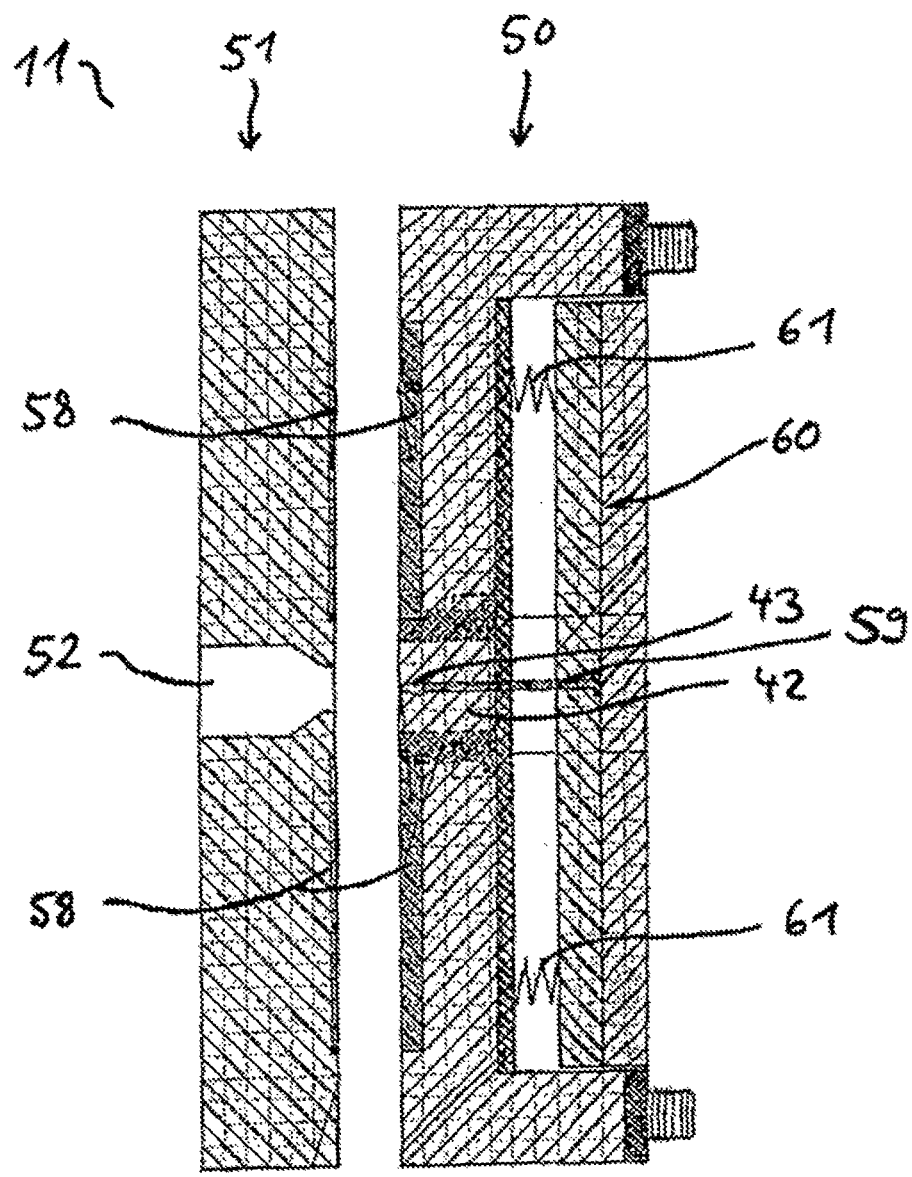
FIG. 19 shows a diagram of a mold insert in a cross-sectional view with a simple ejector unit according to a first embodiment.

FIG. 19 shows a diagram of a mold tool 11 in a cross-sectional view for the production of a very simple molded part. In the case of this embodiment, an injection-molding material manifold head 42, which has runners 43 leading to cavities 58 for a molded part, is provided in the ejector-side mold insert half 50 opposite the injection-molding nozzle insertion opening 52. The injection-molding material manifold head 42 is preferably rotatably mounted, so that the direction of the emergence of injection-molding material can be easily changed and cavities can be shut off as and when required.

An ejector pin 59 is mounted in a linearly movable manner in its direction of extent on an ejector plate 60 and can be moved in the direction of the nozzle-side mold insert half 51 with the aid of the ejector unit 4. In this way, the sprue is removed from the mold insert, together with the molded parts arranged on it, after the injection-molding process. In this way, the molded parts are transported out of the cavities 58 and fall down into a collecting container. For returning the ejector plate 60 with the ejector pin 59, restoring springs 61 are arranged between the ejector plate 60 and the ejector-side mold insert half 50.

Figure 20:
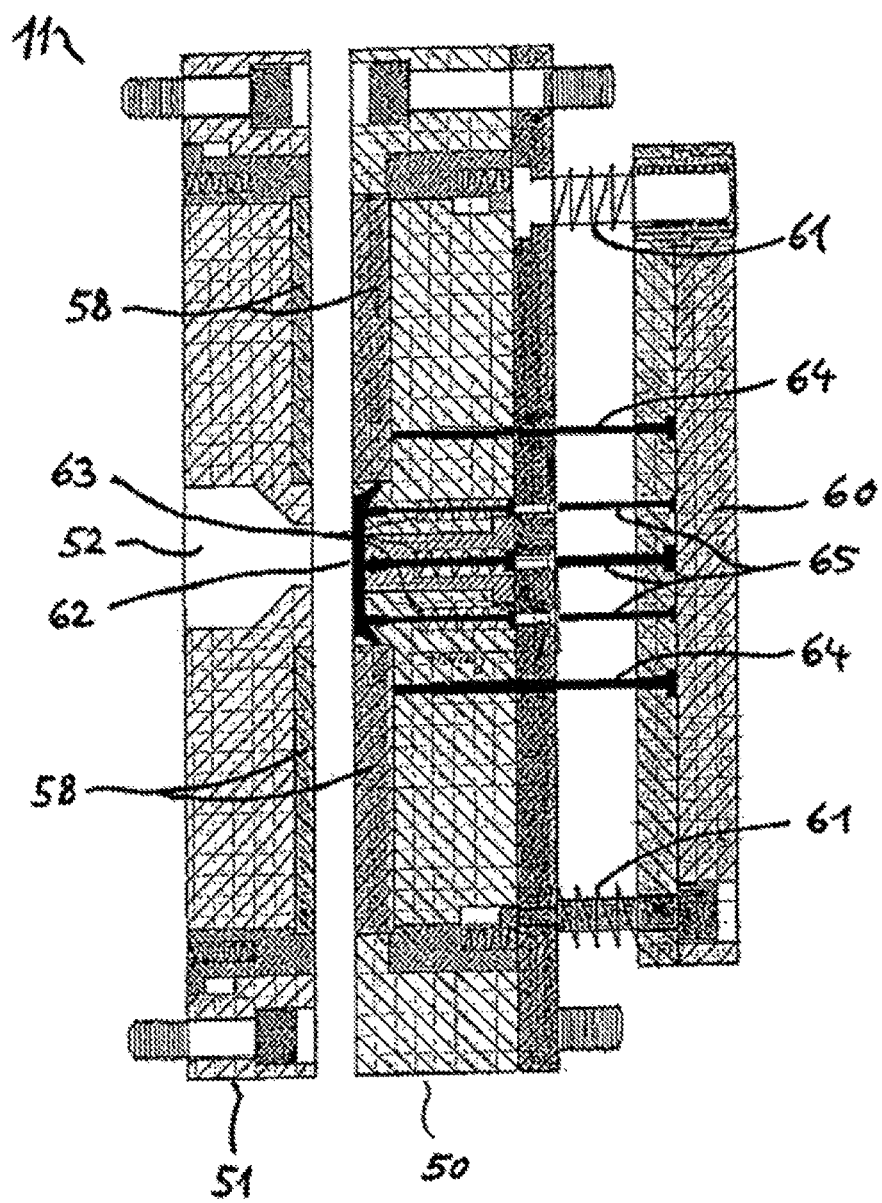
FIG. 20 shows a diagram of a mold insert with a two-stage ejector unit according to a second embodiment in a cross-sectional view.

FIG. 20 shows a somewhat more complex embodiment of a mold insert 11. It is clear that in the ejector-side mold insert half 50 there is arranged opposite the injection-molding nozzle insertion opening 52 of the nozzle-side mold insert half 51a sub-manifold 62, which is, for example, provided with runners and can be brought out in the direction of the nozzle-side mold insert half 51 by spring-loaded ejector pins 63. In this way, the sprue can be removed separately from the molded part. Furthermore, ejector pins 64 are connected directly to the ejector plate 60 of the ejector unit, in order to press the molded parts out of the associated cavities 58. The actuation of the spring-loaded ejector pins 63 takes place by means of further ejector pins 65, which, due to a shortened length, only impinge on the spring-loaded ejector pins 63 once the ejector pins 64 leading into the cavities 58 have pressed the molded parts out of the cavities 58. This ensures that the molded parts are first pressed out of the cavities 58, with the molded parts being detached from the sprue.

Subsequently, the sprue is pressed out with a delay, so that the molded parts are automatically separate from the sprue.

Figure 21:
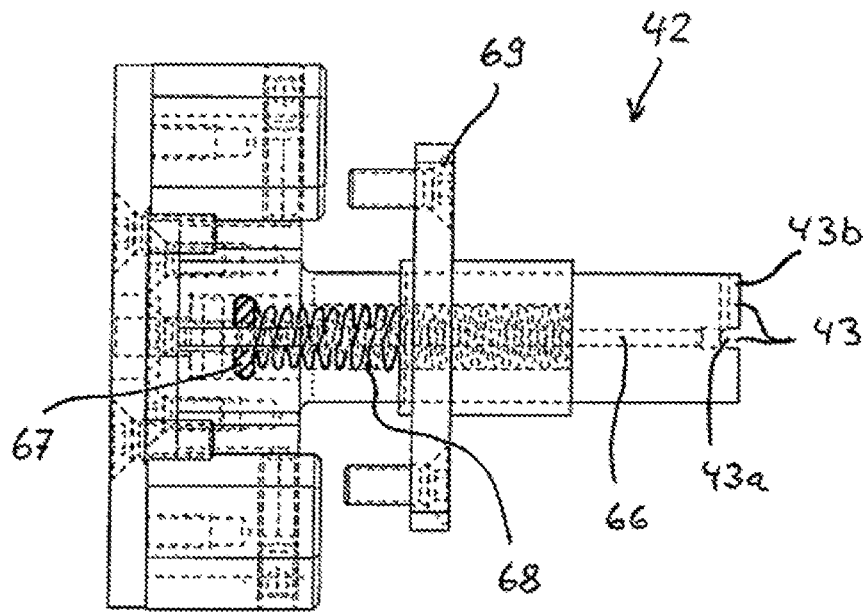
FIG. 21 shows a side view of an injection-molding manifold head with a sprue ejector arranged in a linearly movable manner on it.

FIG. 21 shows a side view of an injection-molding material manifold head 42. It is clear that the injection-molding material manifold head 42 has a runner 43 at its free head end. This runner 43 preferably has a runner portion 43a, leading centrally from one side to the opposite side, and a runner portion 43b, leading off perpendicularly from the first portion. In this way, the alignment of the runners 43 can be changed by turning the injection-molding material manifold head 42, so that either two mold insert halves lying one next to the other and comprising the channels 43 enter into a communicating connection or only one mold insert half is supplied by the runners 43. It is particularly advantageous if the injection-molding material manifold head 38 can be turned in angular increments of 15°.

It can also be seen that a sprue ejector 66 in the form of an ejector pin is mounted in a linearly movable manner in the direction of extent in the injection-molding material manifold head 42. This ejector pin has opposite from its free end a thrust bolt 67, on which a compression spring 68 rests as a restoring spring for the sprue ejector 66.

Furthermore, a guiding piece 69 is mounted on the injection-molding material manifold head 42 and screwed to the ejector-side slide-in frame 10. The guiding piece 69 serves for centering and guiding the injection-molding material manifold head 42.

Figure 22:
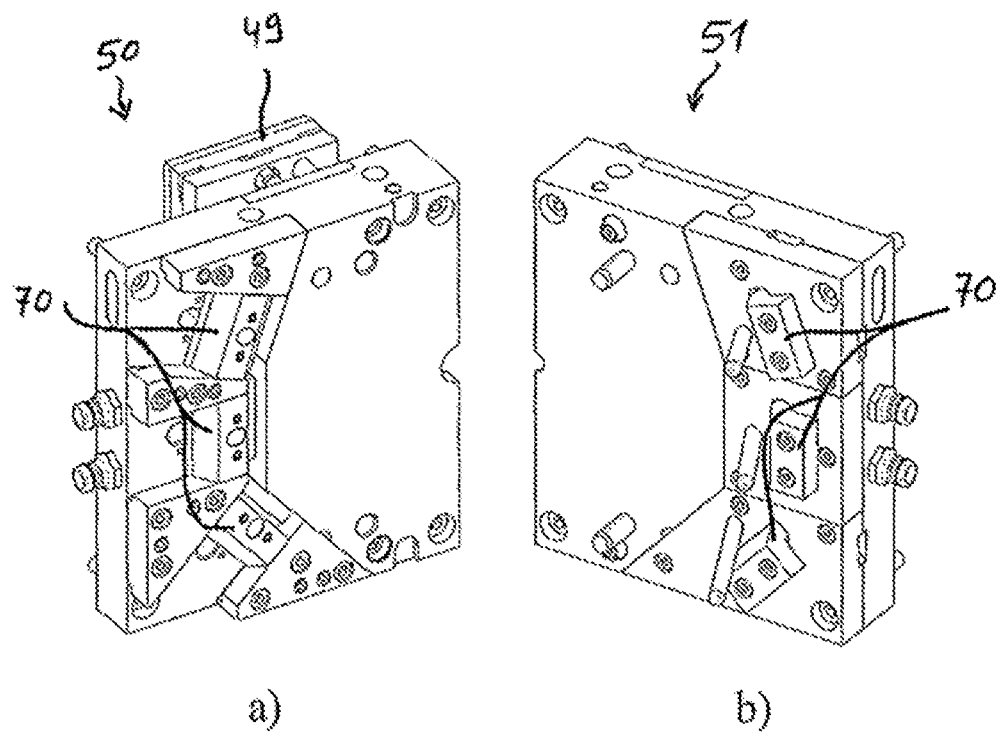
FIGS. 22a)+b) show a diagram of two mold insert halves of a mold insert with slide elements.

FIGS. 22a) and 22b) show a perspective view of the two mold insert halves 50, 51, which in the exemplary embodiment represented are provided with slide elements 70 arranged in a standardized fitting space. These slide elements 70 are movably arranged, in order to bring mold elements into a cavity 58 for the production of molded parts with undercuts and bring them out of the cavity 58 again after production of the molded part.

Figure 23:
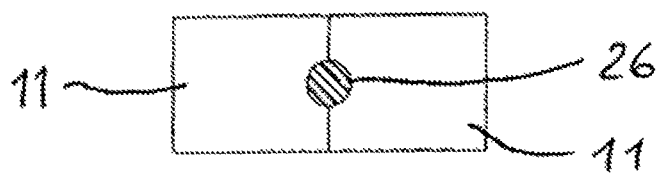
FIGS. 23a)+b) show a diagram of the arrangement of at least one injection-molding nozzle of the nozzle-side tool half for being used jointly for two mold inserts arranged one next to the other.
Figure 23:
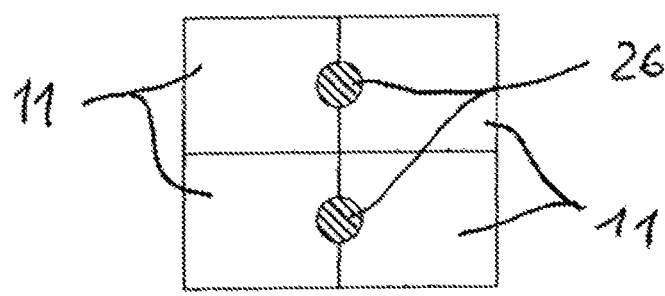

FIG. 23a) shows a basic diagram for standardized tool halves with an injection-molding nozzle 26, which is jointly used by two mold inserts 11 arranged one next to the other.

FIG. 23b) shows another embodiment of a standardized tool half with two injection-molding nozzles 26 lying one above the other, which are respectively used as in FIG. 23a) by two mold inserts 11 lying one next to the other.

Figure 24:
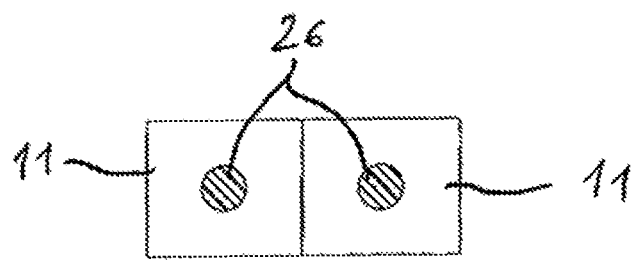
FIGS. 24a)+b) show a diagram of the arrangement of at least two injection-molding nozzles respectively for being used for an assigned mold insert.
Figure 24:
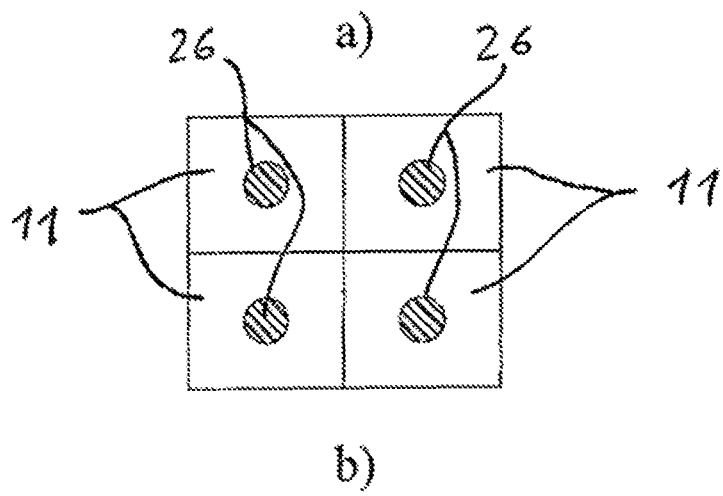

FIGS. 24a) and b) show another embodiment, in which an injection-molding nozzle 26 of the nozzle-side tool half is respectively provided per mold insert 11.

In this way, for example, two injection-molding nozzles 26 lying one next to the other and by which two mold inserts lying one next to the other are supplied can be provided.

According to FIG. 24b), four injection-molding nozzles 26 may also be arranged, distributed in the manner of a matrix, in order to supply four mold inserts 11 lying one next to the other in the manner of a checkerboard.

Figure 25:
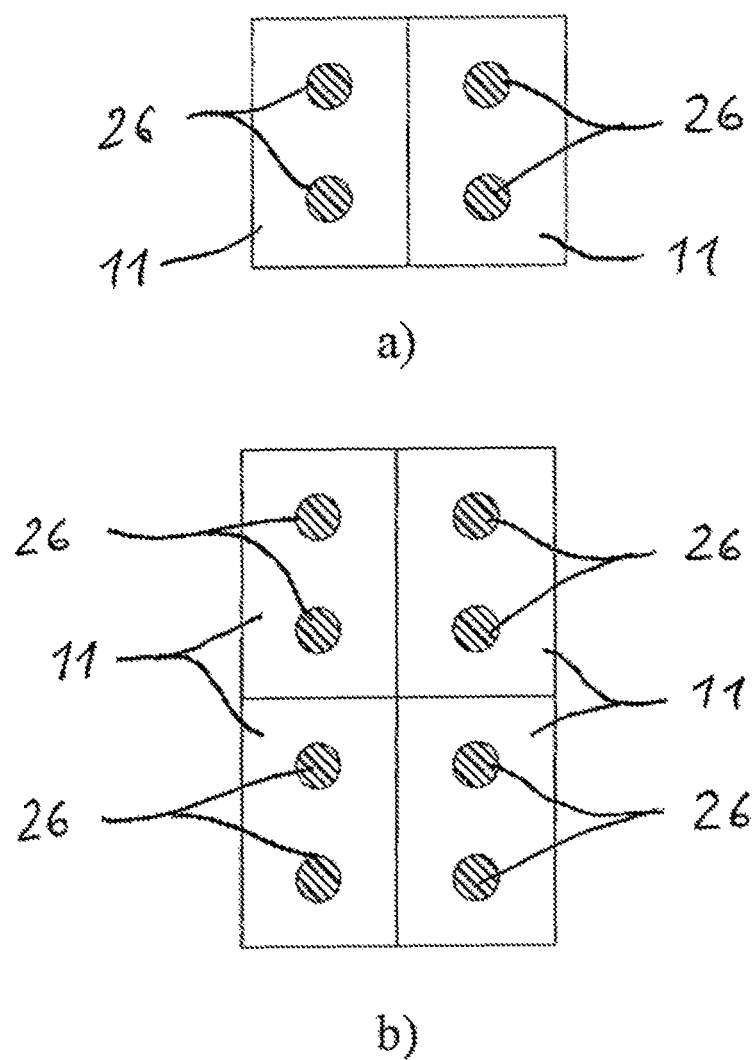
FIGS. 25a)+b) show a diagram of the arrangement of at least two injection-molding nozzles of the nozzle-side tool half using two injection-molding nozzles per mold insert.

FIGS. 25a) and b) show another embodiment, in which there are two injection-molding nozzles 26 of the nozzle-side tool half 2 per mold insert. This on the one hand allows larger molded parts to be produced. On the other hand, in this way a greater number of cavities, i.e. a greater number of parts per mold insert, can also be realized. Conceivable in this respect is an embodiment according to FIG. 25a), in which altogether four injection-molding nozzles 26 are provided for two mold inserts 11 lying one next to the other.

The number of mold inserts 11 may, however, be increased further, so that, for example as shown in FIG. 25b), two pairs of mold inserts 11 lying one next to the other are arranged lying one above the other and are supplied by respectively two injection-molding nozzles 26 lying one above the other. Also alternatively conceivable of course is an embodiment in which the injection-molding nozzles 26 for a mold insert 11 are not arranged one above the other but one next to the other.

Figure 26:
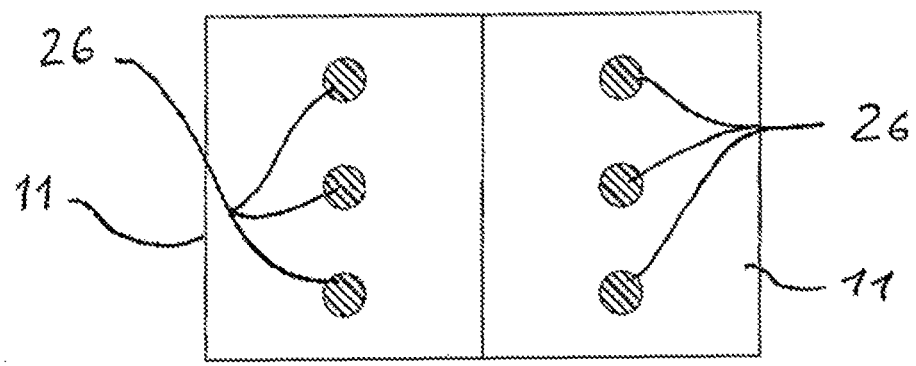
FIGS. 26a)+b) show a diagram of the arrangement of at least six injection-molding nozzles of the nozzle-side tool half using three injection-molding nozzles respectively per mold insert.
Figure 26:
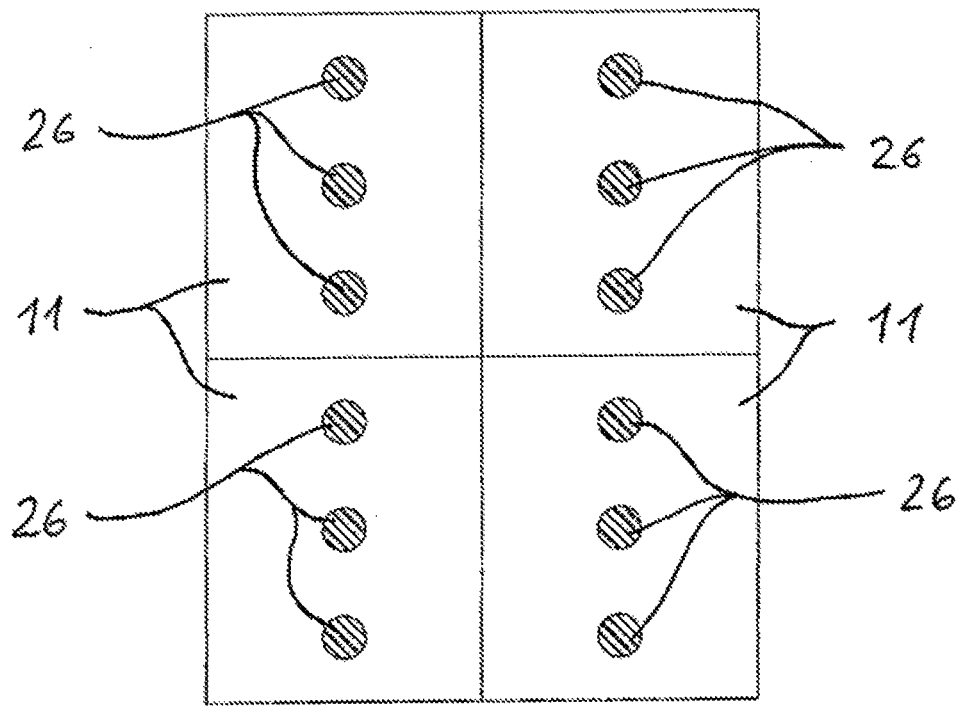

FIGS. 26a) and b) show a further embodiment, in which a number of three injection-molding nozzles 26, for example lying one above the other or one next to the other, are provided per mold insert 11. In the event that the nozzle-side tool half has six injection-molding nozzles 26, two mold inserts lying one next to the other can be supplied at the same time with injection-molding material.

Also conceivable, however, is an embodiment according to FIG. 26b), in which the arrangement from FIG. 26a) is duplicated and two mold insert halves lying one next to the other are respectively arranged one under the other.

Also conceivable in a corresponding way are further variations, in which a still greater number of injection-molding nozzles are present and/or in which at least one injection-molding nozzle 26 of the embodiment presented above is provided for supplying two or more mold inserts 11 simultaneously. Thus, it is conceivable that in the embodiments according to FIGS. 24 to 26 there is provided at least one injection-molding nozzle which, as in FIG. 23, supplies two mold inserts 11 lying one next to the other together with injection-molding material.

What is claimed is:

1. An injection-molding tool for a clamping unit of an injection-molding machine for producing injection-molded parts, comprising:

a frame tool, including of a first, nozzle-side tool half, for attachment to a nozzle-side, fixed platen of the clamping unit of an injection-molding machine, and a second, ejector-side tool half, for attachment to an ejector-side movable platen of the clamping unit of the injection-molding machine, wherein the first, nozzle-side tool half has at least one injection-molding material distributing unit, which interacts with a machine nozzle of the injection-molding machine that can be attached to the nozzle-side platen and which has a runner and at least one injection-molding nozzle, protruding from the first, nozzle-side tool half in the direction of the second, ejector-side tool half, wherein the runner leads from an inlet opening for the attachment of the machine nozzle of the injection-molding machine to the at least one injection-molding nozzle, and the second, ejector-side tool half has at least one ejector unit, and wherein at least one mold insert respectively formed by two mold insert halves and having at least one cavity adapted to a molded part is provided, wherein the first, nozzle-side mold insert half of a mold insert is adapted for connection to the first, nozzle-side tool half and the second, ejector-side mold insert half of the same mold insert is adapted for connection to the second, ejector-side tool half, wherein the mold insert halves of the at least one mold insert are fitted in slide-in frames and the slide-in frames can be connected to one another to form a slide-in module that can be removed from the frame tool, and in that the nozzle-side slide-in frame has at least one nozzle opening for respectively receiving an assigned injection-molding nozzle of the first, nozzle-side tool half.

2. The injection-molding tool according to claim 1, wherein the second, ejector-side mold insert half has a displaceably mounted ejector assembly and the ejector-side slide-in frame has at least one opening for receiving the ejector assembly of an assigned second, ejector-side mold insert half.

3. The injection-molding tool according to claim 1, wherein the ejector-side slide-in frame has at least one projecting injection-molding manifold head, which is aligned for arrangement opposite an assigned injection-molding nozzle and, at its free head end, has runners for conducting injection-molding material emerging from the assigned injection-molding nozzle into cavities of at least one mold insert.

4. The injection-molding tool according to claim 3, wherein the injection-molding manifold head has a sprue ejector arranged in a linearly movable manner in or on the injection-molding manifold head.

5. The injection-molding tool according to claim 3, wherein the injection-molding manifold head is rotatable for adaptation of the alignment of the runners arranged at the free head end.

6. The injection-molding tool according to claim 1, wherein, on both sides of the first or second tool half, guiding profiles extend in the direction of the other tool half and the other tool half is guided in a linearly displaceable manner on the guiding profiles, and in that the slide-in module can then be inserted into the intermediate space between the first and second tool halves and the guiding profiles extending on both sides between the first and second tool halves.

7. The injection-molding tool according to claim 6, characterized by at least one measuring unit, which is on a side wall of a tool half, is aligned with the free end of an assigned guiding profile, which is fixedly connected to the other tool half, and interacts with the free end to verify the clamping pressure of the injection-molding tool.

8. The injection-molding tool according to claim 1, wherein guiding profiles extend in the lower region of one tool half in the direction of the other tool half and the other tool half is mounted in a slidingly displaceable manner on the guiding profiles and is at least partially carried by the guiding profiles in a modifying process of modifying the injection-molding tool.

9. The injection-molding tool according to claim 1, wherein the second, ejector-side tool half has an ejector unit with movable ejector elements, which extend movably in the direction of the first, nozzle-side tool half for the actuation of at least one individualized ejector unit of the at least one assigned mold insert.

10. The injection-molding tool according to claim 1, wherein the first, nozzle-side tool half has adjacent to the slide-in module a nozzle-side mold plate, which can be connected to at least one further plate of the first, nozzle-side tool half and, for a process of modifying the injection-molding tool, can optionally be detached from the at least one further plate of the first, nozzle-side tool half and can be connected to the second, ejector-side tool half, while leaving an intermediate space for the slide-in module.

11. The injection-molding tool according to claim 10, wherein pivotable locking levers are arranged on both sides of the nozzle-side mold plate for locking optionally to a further plate of the first, nozzle-side tool half or to the second, ejector-side tool half.

12. The injection-molding tool according to claim 1, wherein the mold insert halves respectively have temperature-control channels with inlets and outlets communicating therewith for conducting through fluid for cooling or heating the mold insert.

13. The injection-molding tool according to claim 1, wherein mold inserts have movably mounted slide elements for demolding molded parts that have undercuts.

14. The injection-molding tool according to claim 1, wherein heat-insulating panels, heat-insulating intermediate layers and/or spacing panels are arranged between the slide-in frames and the mold inserts to reduce heat transfer.

15. A method for modifying an injection-molding tool according to claim 1 on an injection-molding machine, characterized by the steps of:
  opening the clamping unit by moving the second, ejector-side tool half in a direction away from the first, nozzle-side tool half;
  detaching the nozzle-side slide-in frame from the first, nozzle-side tool half and detaching the ejector-side slide-in frame from the second, ejector-side tool half;
  closing the clamping unit of the injection-molding machine by moving the second, ejector-side tool half in the direction of the first, nozzle-side tool half;
  uncoupling a nozzle-side mold plate of the first, nozzle-side tool half from the further elements of the first, nozzle-side tool half and coupling this nozzle-side mold plate (to the second, ejector-side tool half;
  opening the clamping unit by moving the second, ejector-side tool half in a direction away from the first, nozzle-side tool half;
  lifting the slide-in module formed by setting a bridge between the slide-in frames out from the frame tool;
  inserting another slide-in module into the frame tool;

closing the clamping unit by moving the second, ejector-side tool half in the direction of the first, nozzle-side tool half;

uncoupling the nozzle-side mold plate from the second, ejector-side tool half and coupling the nozzle-side mold plate to the first, nozzle-side tool half;

opening the clamping unit by detaching the bridge for individualizing the slide-in frames by moving the second, ejector-side tool half in a direction away from the first, nozzle-side tool half; and connecting the nozzle-side slide-in frame to the first, nozzle-side tool half and the ejector-side slide-in frame to the second, ejector-side tool half.

* * * * *